(12) United States Patent
Zhou et al.

(10) Patent No.: US 11,300,776 B2
(45) Date of Patent: Apr. 12, 2022

(54) COUPLED AND SYNCHRONOUS MIRROR ELEMENTS IN A LIDAR-BASED MICRO-MIRROR ARRAY

(71) Applicant: Beijing Voyager Technology Co., Ltd., Beijing (CN)

(72) Inventors: Qin Zhou, Mountain View, CA (US); Youmin Wang, Mountain View, CA (US)

(73) Assignee: Beijing Voyager Technology Co., Ltd., Beijing (CN)

( * ) Notice: Subject to any disclaimer, the term of this patent is extended or adjusted under 35 U.S.C. 154(b) by 201 days.

(21) Appl. No.: 16/214,013

(22) Filed: Dec. 7, 2018

(65) Prior Publication Data

US 2020/0183126 A1 Jun. 11, 2020

(51) Int. Cl.
*G02B 26/08* (2006.01)
*G02B 26/10* (2006.01)
(Continued)

(52) U.S. Cl.
CPC ............ *G02B 26/08* (2013.01); *G01S 7/4817* (2013.01); *G02B 7/1821* (2013.01);
(Continued)

(58) Field of Classification Search
CPC .. G02B 26/101; G02B 26/105; G02B 26/085; G02B 26/0858; G02B 26/0841;
(Continued)

(56) References Cited

U.S. PATENT DOCUMENTS 7,941,019 B1 * 5/2011 Brooks .................. C03B 37/10
359/341.3
10,146,020 B1 * 12/2018 Yasumura ............ G02B 6/4206
(Continued)

FOREIGN PATENT DOCUMENTS

CN 106353891 A 1/2017

OTHER PUBLICATIONS

International Search Report and Written Opinion for PCT/US2018/065040 dated Mar. 15, 2019, 9 pages.
(Continued)

*Primary Examiner* — Darryl J Collins
*Assistant Examiner* — Tamara Y. Washington
(74) *Attorney, Agent, or Firm* — Kilpatrick Townsend & Stockton LLP

(57) ABSTRACT

Some embodiments include a MEMS apparatus configured to redirect light in a LiDAR system and includes a support frame and a plurality of mirror elements disposed in a linear array within the support frame including a first mirror element and a second mirror element. Each of the plurality of mirror elements can be rotatable on a rotational axis that is perpendicular to a line defined by the linear array of the plurality of mirror elements and bisects the corresponding mirror element into a first portion and a second portion. The apparatus can include a coupling element having a distal end physically coupled to a first portion of the first mirror element and a proximal end physically coupled to a second portion of the second mirror element such that a rotation of the first mirror element causes a synchronous and equal rotation of the second mirror element.

18 Claims, 13 Drawing Sheets

(51) Int. Cl.
*G02B 26/12* (2006.01)
*G01S 7/481* (2006.01)
*G02B 7/182* (2021.01)
*G01S 7/484* (2006.01)
*G01S 17/931* (2020.01)

(52) U.S. Cl.
CPC ......... *G02B 26/0833* (2013.01); *G02B 26/10* (2013.01); *G01S 7/484* (2013.01); *G01S 17/931* (2020.01)

(58) Field of Classification Search
CPC .... G02B 26/0833; G02B 26/12; G02B 26/10; G02B 26/103; G02B 26/121; G02B 26/26; G02B 7/1821; B81B 2203/058; B81B 3/007; B81B 2201/042; H04N 9/3129; H04N 1/1135; H04N 1/113
USPC .............................................. 359/198.1, 201.2
See application file for complete search history.

(56) References Cited

U.S. PATENT DOCUMENTS

| | | | | |
|---|---|---|---|---|
| 10,214,105 | B2* | 2/2019 | El Khoury | B60K 35/00 |
| 10,422,881 | B1* | 9/2019 | Wang | G02B 26/085 |
| 10,509,198 | B1* | 12/2019 | Zhou | G02B 7/1821 |
| 10,776,639 | B2* | 9/2020 | Steinberg | G06K 9/2027 |
| 2014/0153001 | A1* | 6/2014 | Chayat | G01S 17/10 |
| | | | | 356/612 |
| 2015/0253469 | A1* | 9/2015 | Le Gros | G02B 3/0006 |
| | | | | 359/619 |
| 2016/0170202 | A1* | 6/2016 | Yasuda | G02B 26/0858 |
| | | | | 356/4.01 |
| 2018/0364419 | A1* | 12/2018 | Yasumura | G02B 6/356 |
| 2019/0177157 | A1* | 6/2019 | Sarma | G02B 1/10 |
| 2019/0204575 | A1* | 7/2019 | Lukes | G02B 26/0825 |
| 2019/0227175 | A1* | 7/2019 | Steinberg | G01S 17/89 |
| 2019/0250525 | A1* | 8/2019 | Komaki | G03F 7/0002 |
| 2019/0271767 | A1* | 9/2019 | Keilaf | G01S 7/489 |
| 2019/0317217 | A1* | 10/2019 | Day | G01S 7/026 |
| 2019/0331922 | A1* | 10/2019 | Kim | A61B 3/1015 |
| 2020/0011998 | A1* | 1/2020 | Koyama | G01C 22/00 |
| 2020/0049976 | A1* | 2/2020 | Grasshoff | G02B 7/192 |
| 2020/0182425 | A1* | 6/2020 | Mouri | F21S 41/675 |
| 2020/0182975 | A1* | 6/2020 | Wang | G02B 27/30 |
| 2020/0182976 | A1* | 6/2020 | Zhou | B81B 3/00 |
| 2020/0182977 | A1* | 6/2020 | Wang | G02B 26/0841 |
| 2020/0182979 | A1* | 6/2020 | Wang | G02B 26/101 |
| 2020/0183125 | A1* | 6/2020 | Zhou | G02B 26/101 |
| 2020/0183126 | A1* | 6/2020 | Zhou | G02B 26/0833 |
| 2020/0183149 | A1* | 6/2020 | Zhou | G01S 17/931 |
| 2020/0191968 | A1* | 6/2020 | Nauen | G01S 7/003 |
| 2020/0249324 | A1* | 8/2020 | Steinberg | G01S 17/931 |
| 2020/0249349 | A1* | 8/2020 | Steinberg | G01S 7/4863 |
| 2020/0249354 | A1* | 8/2020 | Yeruhami | G01S 7/4911 |
| 2020/0292672 | A1* | 9/2020 | Wang | G02B 5/09 |
| 2020/0292679 | A1* | 9/2020 | Osiroff | G01S 17/06 |
| 2020/0292709 | A1* | 9/2020 | Eshel | B81B 3/0018 |

OTHER PUBLICATIONS

PCT/US2018/065040, "International Preliminary Report on Patentability", dated Jun. 17, 2021, 7 pages.

* cited by examiner

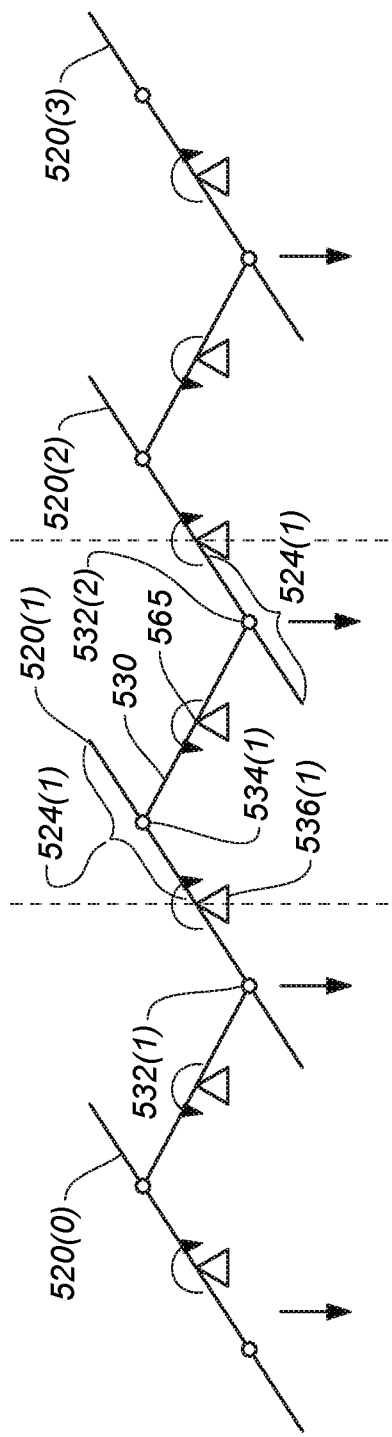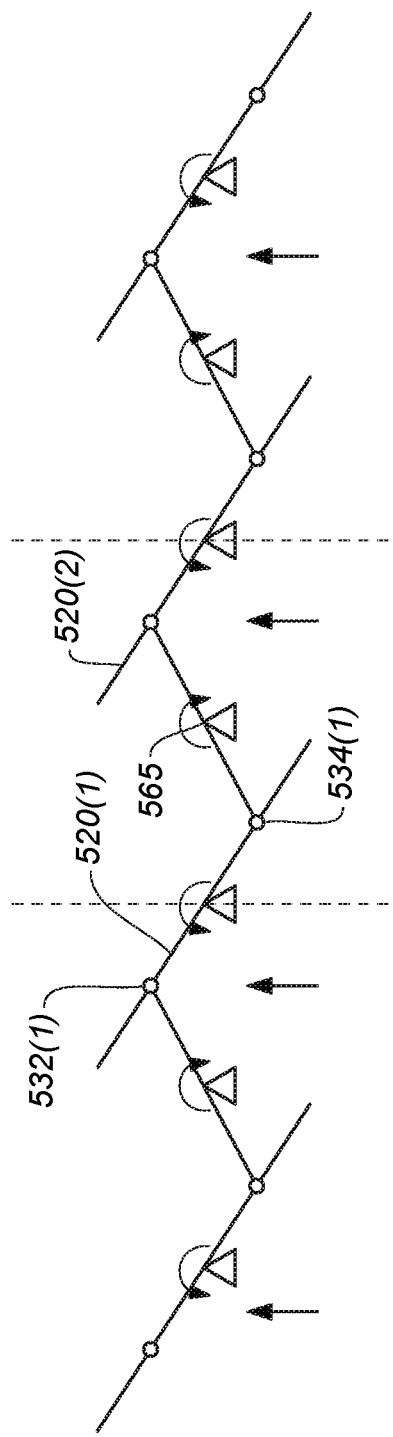

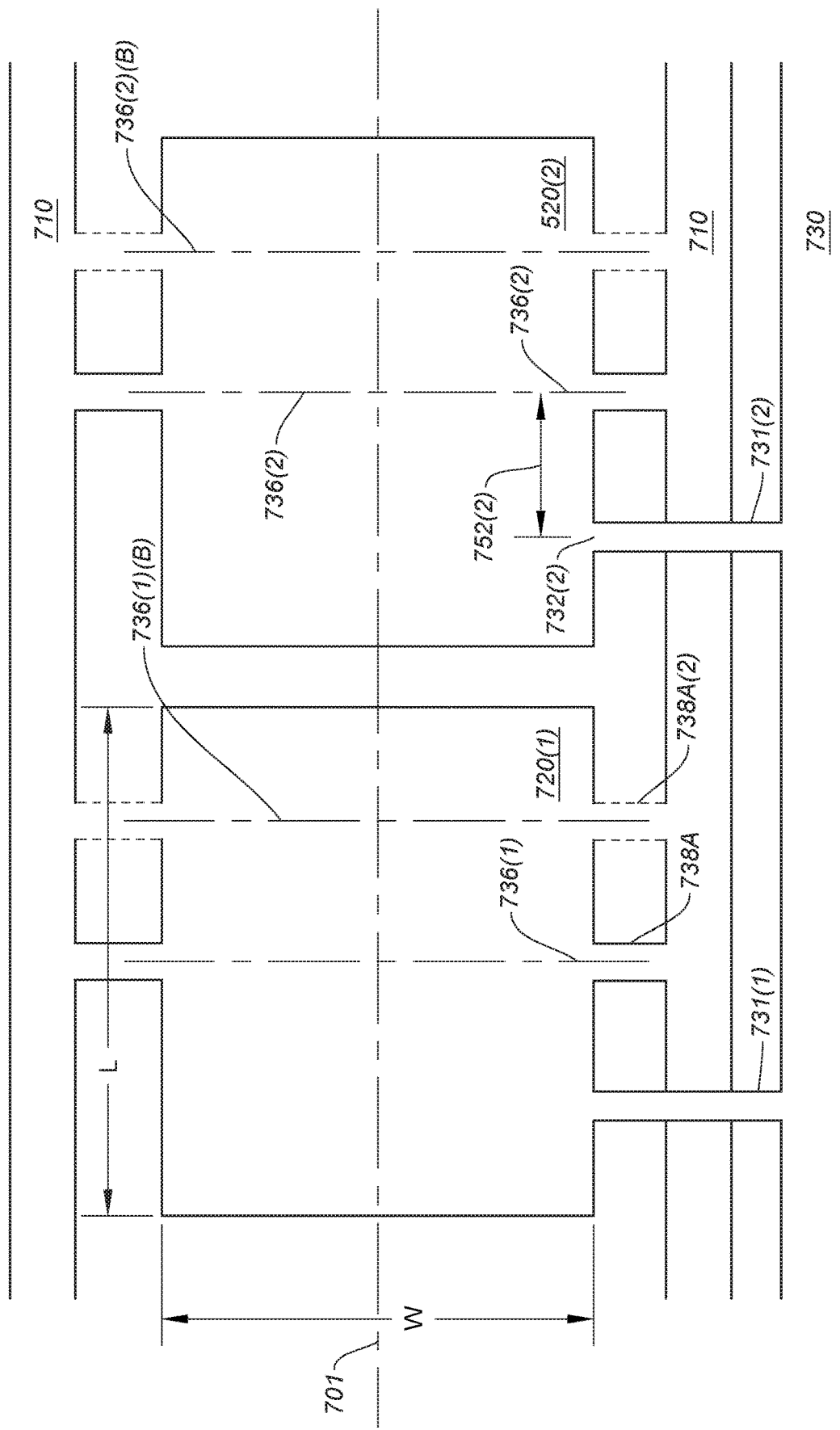

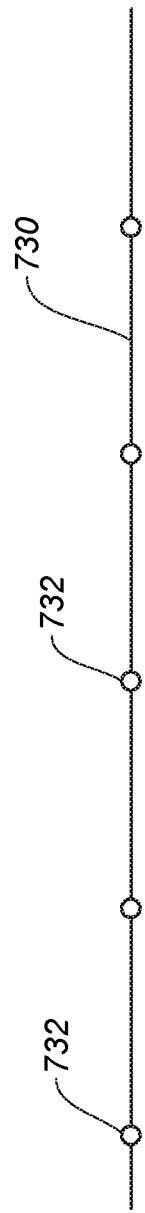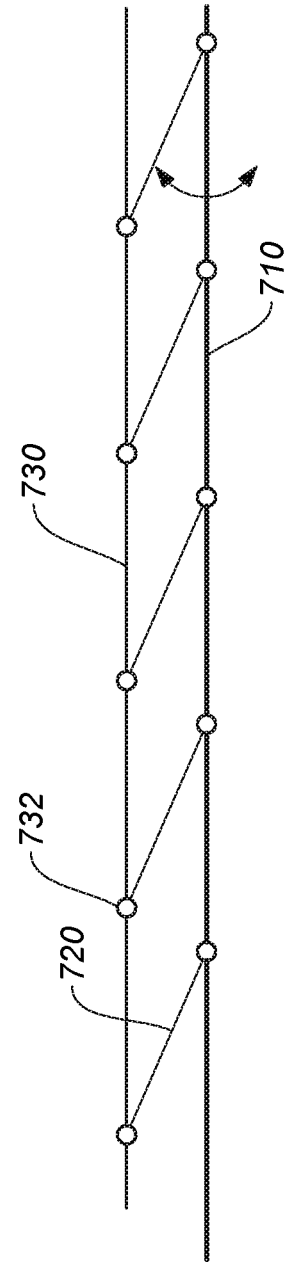

COUPLED AND SYNCHRONOUS MIRROR ELEMENTS IN A LIDAR-BASED MICRO-MIRROR ARRAY

CROSS-REFERENCES TO RELATED APPLICATIONS

The following eight U.S. patent applications listed below (which includes the present application) are being filed concurrently, and the entire disclosures of the other applications are incorporated by reference into this application for all purposes:

Application Ser. No. 16/213,990, filed Dec. 7, 2018, entitled "MULTI-THRESHOLD LIDAR DETECTION";

Application Ser. No. 16/213,992, filed Dec. 7, 2018, entitled "MIRROR ASSEMBLY FOR LIGHT STEERING";

Application Ser. No. 16/214,010, filed Dec. 7, 2018, entitled "COUPLED AND SYNCHRONOUS MIRROR ELEMENTS IN A LIDAR-BASED MICRO-MIRROR ARRAY";

Application Ser. No. 16/214,013, filed Dec. 7, 2018, entitled "COUPLED AND SYNCHRONOUS MIRROR ELEMENTS IN A LIDAR-BASED MICRO-MIRROR ARRAY";

Application Ser. No. 16/213,995, filed Dec. 7, 2018, entitled "NON-LINEAR SPRINGS TO UNIFY THE DYNAMIC MOTION OF INDIVIDUAL ELEMENTS IN A MICRO-MIRROR ARRAY";

Application Ser. No. 16/213,997, filed Dec. 7, 2018, entitled "NON-LINEAR SPRINGS TO UNIFY THE DYNAMIC MOTION OF INDIVIDUAL ELEMENTS IN A MICRO-MIRROR ARRAY";

Application Ser. No. 16/213,999, filed Dec. 7, 2018, entitled "A LEVER SYSTEM FOR DRIVING MIRRORS OF A LIDAR TRANSMITTER", and Application Ser. No. 16/214,001, filed Dec. 7, 2018, entitled "SYSTEM AND METHODS FOR CONTROLLING MICRO-MIRROR ARRAY".

BACKGROUND

Modern vehicles are often fitted with a suite of environment detection sensors that are designed to detect objects and landscape features around the vehicle in real-time that can be used as a foundation for many present and emerging technologies such as lane change assistance, collision avoidance, and autonomous driving capabilities. Some commonly used sensing systems include optical sensors (e.g., infra-red, cameras, etc.), radio detection and ranging (RADAR) for detecting presence, direction, distance, and speeds of other vehicles or objects, magnetometers (e.g., passive sensing of large ferrous objects, such as trucks, cars, or rail cars), and light detection and ranging (LiDAR).

LiDAR typically uses a pulsed light source and detection system to estimate distances to environmental features (e.g., vehicles, structures, etc.). In some systems, a laser or burst of light (pulse) is emitted and focused through a lens assembly and a reflection of the pulse off of an object is collected by a receiver. A time-of-flight (TOF) of the pulse can be measured from the time of emission to the time the reflection is received, which may manifest as a single data point. This process can be repeated very rapidly over any desired range, which may typically be over an area in front of the vehicle, or over a 360 degree radius. The TOF measurements can be captured to form a collection of points that are dynamically and continuously updated in real-time, forming a "point cloud." The point cloud data can be used to estimate, for example, a distance, dimension, and location of the object relative to the LiDAR system, often with very high fidelity (e.g., within 5 cm), that can be used to map an area around the vehicle such that the vehicle is spatially aware of its surroundings and can, for example, alert a driver to obstacles, hazards, or points of interest, or take a corrective action (e.g., apply brakes) in the event of a possible collision.

Despite the promise that LiDAR and other sensing systems bring to the continued development of fully autonomous transportation, there are challenges that limit its widespread adoption. LiDAR systems are often expensive, large, and bulky. In some cases, multiple emitters may be needed to accurate track a scene, particularly for systems that require accuracy over a large range and field-of-view (FOV). While significant strides have been made to push autonomous vehicle technology to greater commercial adoption, more improvements are needed.

BRIEF SUMMARY

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following detailed description, claims, and accompanying drawings.

In some embodiments, a micro-electro-mechanical system (MEMS) apparatus configured to redirect light in a light detection and ranging (LiDAR) system can include a support frame; a plurality of mirror elements disposed in a linear array in an end-to-end, longitudinally configured arrangement within the support frame, the plurality of mirror elements including: a first mirror element; and a second mirror element, the second mirror element adjacent to and linearly aligned with the first mirror element. Each mirror element of the plurality of mirror elements may be rotatable on a rotational axis that is perpendicular to a line defined by the linear array of the plurality of mirror elements, the rotational axis of each mirror element bisecting the corresponding mirror element into a first portion and a second portion. The MEMS apparatus can further include a coupling element having a distal end coupled to a first portion of the first mirror element and a proximal end coupled to a second portion of the second mirror element, whereby the coupling element physically couples the first and second mirror elements such that a rotation of the first mirror element causes a synchronous and equal rotation of the second mirror element, and a rotation of the second mirror element causes a synchronous and equal rotation of the first mirror element.

In certain embodiments, each mirror element can include a first coupling location on its first portion and a second coupling location on its second portion, the first coupling location and second coupling location defining where the coupling element is configured to couple to, where the first coupling location and the second coupling location are equidistant from and on opposite sides of a rotational axis of the corresponding mirror element. The MEMS apparatus can further include one or more processors; and one or more MEMS motors controlled by the one or more processors and configured to rotate at least one of the first mirror element and second mirror element, where the coupling element causes the plurality of mirror elements to synchronously, mechanically, and equally rotate over a range of motion as the one or more MEMS motors rotates the at least one of the first mirror element and second mirror element. The range of motion can include any suitable rotational range (e.g., within 90 degrees). In some cases, the support frame, the plurality of mirror elements, and the coupling element together can form a continuous, unitary structure formed on a common substrate (e.g., etched on a same plane of a semiconductor substrate). In further embodiments, the MEMS apparatus can also include a third mirror element (or more), the third mirror element adjacent to and linearly aligned with the second mirror element; and a second coupling element having a distal end coupled to a first portion of the second mirror element and a proximal end coupled to a second portion of the third mirror element, whereby the coupling element physically couples the second and third mirror elements such that a rotation of the third mirror element causes a synchronous and equal rotation of the first and second mirror elements.

The first portion of the first mirror element and the second portion of the second mirror can both include a longitudinally-oriented channel that is configured to allow the coupling element to pass through a plane defined by the first mirror element and the second mirror element as the first and second mirror elements are rotated. In some cases, the coupling element may be flexible and may flex as the first and second mirror elements are rotated. The support frame can include a coupling element support configured parallel to the rotational axes of the first and second mirror elements and between the first and second mirror elements, where the coupling element pivots on the coupling element support as the first and second mirror elements are rotated. The first mirror element may be coupled to the support frame by at least one support hinge (typically two linearly aligned hinges) configured along the rotational axis and facilitates the rotation of the first and second mirror elements along the rotational axis. In some cases, the at least one support hinge, the support frame, the first and second mirror elements, and the coupling element are a continuous, unitary structure, and may be formed (e.g., etched via photolithography or other semiconductor fabrication processes, etc.) on a common substrate. Each of the plurality of mirror elements may be of the same size and dimensions. For instance, some embodiments may be configured such that each of the plurality of mirror elements are rectangular with two opposing ends separated by a first distance defining a length and longitudinal arrangement of the corresponding mirror element, and two opposing sides separated by a second distance defining a width of the corresponding mirror element. In some implementations, the support frame can include a support structure that is configured perpendicular to the linear array and at a location between the first and second mirrors, where the support structure supports the coupling element at a pivot point, and where the coupling element rotates at the pivot point.

In certain embodiments, a MEMS apparatus configured to redirect light in a LiDAR system may include a support frame; a first mirror element coupled to the support frame by a first support hinge, wherein the first mirror element is rotatable relative to the support frame along a rotational axis at the first support hinge and defined by an orientation of the first support hinge; a second mirror element coupled to the support frame by a second support hinge, wherein the second mirror element is rotatable relative to the support frame along a rotational axis at the second support hinge and defined by an orientation of the second support hinge; and a coupling element coupling the first mirror element to the second mirror element such that a rotation of the first mirror element causes the second mirror element to rotate synchronously and equally with the first mirror element, and a rotation of the second mirror element causes the first mirror element to rotate synchronously and equally with the second mirror element. The first and second mirror elements may be disposed in a linear array in an end-to-end, longitudinally configured arrangement within the support frame. Typically, the array is more than two mirror elements, as shown in FIGS. 5B-5D and 7B-7D. In some cases, the first and second mirror elements can have a rotation range of 90 degrees (typically within 45-90 degrees), however other ranges are possible. The support frame, the first and second mirror elements, and the coupling element together may form a continuous, unitary structure formed on a common substrate. In some cases, the coupling element may flex as the first and second mirror elements are rotated. Further, the support frame can include a coupling element support configured parallel to the rotational axes of the first and second mirror elements and between the first and second mirror elements, and wherein the coupling element pivots on the coupling element support as the first and second mirror elements are rotated.

In certain embodiments, a MEMS apparatus configured to redirect light in a LiDAR system can include a support frame; a plurality of mirror elements disposed in a linear array in an end-to-end, longitudinally configured arrangement within the support frame, wherein each mirror element of the plurality of mirror elements is rotatable on a rotational axis that is perpendicular to a line defined by the linear array of the plurality of mirror elements; and a coupling element configured adjacent to and in parallel with the linear array of the plurality of mirror elements, the coupling element coupled to substantially a same location at each of the plurality of mirror elements, whereby the coupling element physically couples each of the plurality of mirror elements together such that a rotation of any one of the plurality of mirror elements causes a synchronous and equal rotation of the remaining mirror elements of the plurality of mirror elements coupled to the coupling element. The MEMS apparatus may further include one or more processors; and one or more MEMS motors or actuators controlled by the one or more processors and configured to drive the coupling element that causes the plurality of mirror elements to synchronously and equally rotate over a range of motion. The range of motion, au include a rotational range of within 90 degrees (e.g., 45-90 degrees), although other ranges are possible. The support frame, the coupling element, and the plurality of mirror elements may be formed as a continuous, unitary structure with a common substrate. In some cases, the common substrate can be a semiconductor substrate and the support frame, the coupling element, and the plurality of mirror elements may be on a common plane.

Each of the plurality of mirror elements can be of the same size and dimensions, although other arrangements are possible. The first mirror element can be coupled to the support frame by at least one support hinge configured along the rotational axis and facilitates the rotation of the first and second mirror elements along the rotational axis. In some embodiments, the at least one support hinge, the support frame, the first and second mirror elements, and the coupling element can be a common, unitary structure formed on a common substrate. Each of the plurality of mirror elements can be rectangular with two opposing ends separated by a first distance defining a length and longitudinal arrangement of the corresponding mirror element; and two opposing sides separated by a second distance defining a width of the corresponding mirror element. Other shapes of mirror elements are possible, as would be appreciated by one of ordinary skill in the art with the benefit of this disclosure. The coupling elements may flex as the first and second mirror elements are rotated.

In further embodiments, a MEMS apparatus configured to redirect light in a LiDAR system may include a support frame; a plurality of mirror elements disposed in a linear array within the support frame, wherein each mirror element of the plurality of mirror elements is rotatable on a rotational axis that is perpendicular to a line defined by the linear array of the plurality of mirror elements; and a coupling element coupled to substantially a same location at each of the plurality of mirror elements, whereby the coupling element physically couples each of the plurality of mirror elements together such that a rotation of any one of the plurality of mirror elements causes a synchronous and equal rotation of the remaining mirror elements of the plurality of mirror elements coupled to the coupling element. The MEMS apparatus may include one or more processors; and one or more MEMS motors or actuators controlled by the one or more processors and configured to drive the coupling element that causes the plurality of mirror elements to synchronously and equally rotate over a range of motion. The range of motion can include a rotational range of within 90 degrees (e.g., 45-90 degrees, or other suitable range). The support frame and the plurality of mirror elements can be formed on a common substrate and each of the plurality of mirror elements may be of the same size and dimensions. For example, some embodiments may be configured such that each of the plurality of mirror elements are rectangular with two opposing ends separated by a first distance defining a length and longitudinal arrangement of the corresponding mirror element; and two opposing sides separated by a second distance defining a width of the corresponding mirror element. The first mirror element can be coupled to the support frame by at least one support hinge (typically two support hinges, as shown in FIGS. 7A-7D) configured along the rotational axis that facilitates the rotation of the first and second mirror elements along the rotational axis. In some cases, the at least one support hinge, the support frame, the first and second mirror elements, and the coupling element are a unitary structure that may be formed on a common substrate. In some cases, these structures may be formed on a common plane.

In certain embodiments, a MEMS apparatus configured to redirect light in a LiDAR system may include a support frame; a plurality of mirror elements disposed in a linear array within the support frame, wherein each mirror element of the plurality of mirror elements is rotatable on a rotational axis that is perpendicular to a line defined by the linear array of the plurality of mirror elements; at least one support hinge for each of the plurality of mirror elements, each support hinge configured along the rotational axis and configured to couple a corresponding mirror element to the support frame, each support hinge configured to facilitate the rotation of the first and second mirror elements along the rotational axis; and a flexible coupling element coupled to substantially a same location at each of the plurality of mirror elements, whereby the coupling element physically couples each of the plurality of mirror elements together such that a rotation of any one of the plurality of mirror elements causes a synchronous and equal rotation of the remaining mirror elements of the plurality of mirror elements coupled to the coupling element. In some embodiments, the at least one support hinge, the support frame, the first and second mirror elements, and the coupling element can be a unitary structure formed on a common substrate.

BRIEF DESCRIPTION OF THE DRAWINGS

The detailed description is set forth with reference to the accompanying figures.

FIGS. 6A-6B show simplified functional diagrams of the coupled, synchronous linear array of micro-mirrors shown in FIGS. 5A-5F, according to certain embodiments.

FIGS. 7A-7E show a second type of coupled, synchronous linear array of micro-mirrors operating over a range of motion, according to certain embodiments.

FIGS. 8A-8B show simplified functional diagrams of the coupled, synchronous linear array of micro-mirrors shown in FIGS. 7A-7E, according to certain embodiments.

DETAILED DESCRIPTION

Aspects of the present disclosure relate generally to object tracking systems, and more particularly to MEMS-based, synchronous micro-mirror array systems configured for light steering in a LiDAR system.

In the following description, various examples of MEMS-based, synchronous micro-mirror array systems are shown and described. For purposes of explanation, specific configurations and details are set forth in order to provide a thorough understanding of the embodiments. However, it will be apparent to one skilled in the art that certain embodiments may be practiced or implemented without every detail disclosed. Furthermore, well-known features may be omitted or simplified in order to prevent any obfuscation of the novel features described herein.

Figure 1:
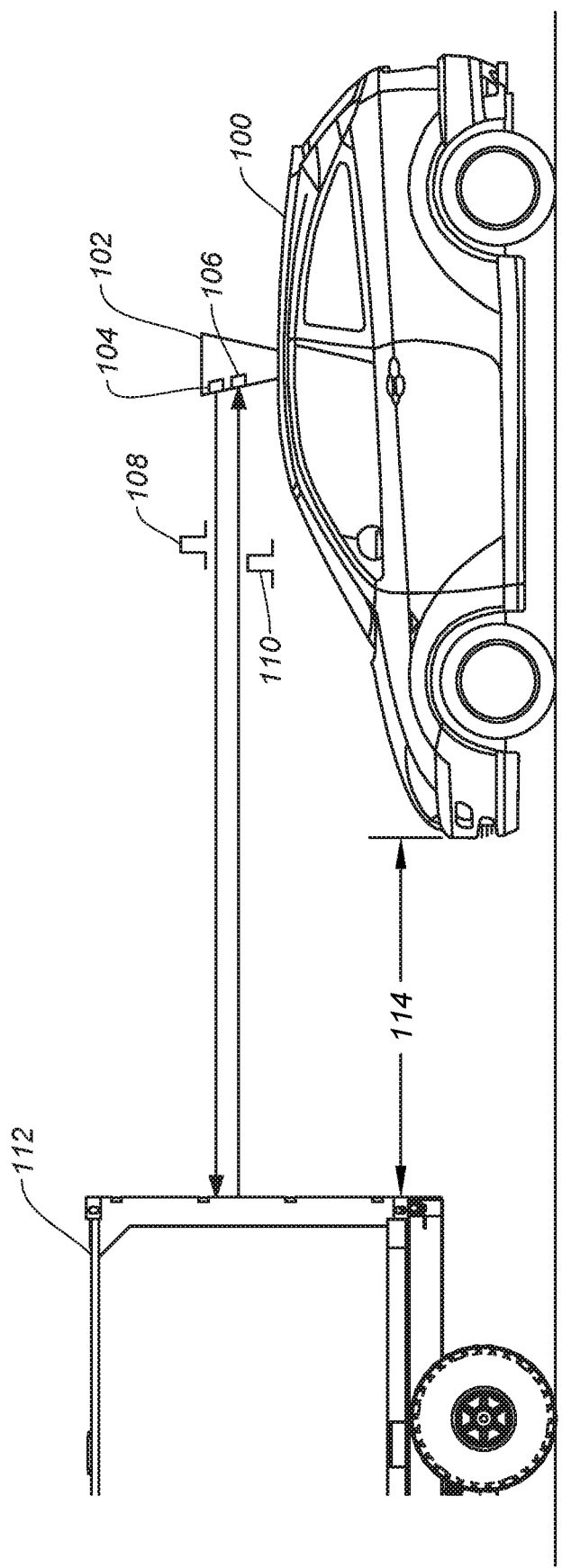
FIG. 1 shows an autonomous driving vehicle using a LiDAR-based system, according to certain embodiments.

The following provides a general non-limiting overview of the disclosure that follows. A LiDAR system typically uses a pulsed light source that is focused through a lens assembly to transmit and receive pulses reflected off of an object, with each detected return pulse captured as a single data point. An example of a LiDAR system on an autonomous vehicle is shown in FIG. 1, and is further described below. A TOF for each detected measurement can be captured to form a collection of points that are dynamically and continuously updated in real-time, forming a "point cloud." The point cloud data can be used to estimate, for example, a distance, dimension, and location of the object relative to the LiDAR system. In order to transmit and detect pulses in two or more dimensions, a light deflecting or "light steering" system (see, e.g., FIG. 2) can be used to both deflect the transmit and receive pulses over a range to generate a larger field of view for object detection. In some systems, a light steering apparatus may include a movable mirror assembly to allow configurability in the direction of light projection. A mirror in the mirror assembly can be moved (e.g., rotated/tilted) by actuators (controlling coupling elements, as described below) to reflect (and steer) light from a light source towards a pre-configured angle. The mirror can be rotated to provide a first range of angles of projection along a first (e.g., vertical) axis for a one-dimensional (1D) field-of-view and, in some implementations, a second range of angles of projection along a second (e.g., horizontal) axis, which can be orthogonal to the first axis. The first range and the second range of angles of projection can define a 1D or 2D field-of-view that an object can be detected. The mirror assembly can have a material effect on various performance metrics of the light steering apparatus including precision, actuation power, FOV, dispersion angle, reliability, resolution, ranging, and imaging properties. In some embodiments, certain features of the light steering system, including the mirror assembly, actuators, and the control circuitries that configure the actuators to set the angles of projection, can be formed as microelectromechanical systems (MEMS) on a semiconductor substrate.

In some cases, the optical aperture of the system may be determined by the mirror size. A larger optical aperture is often preferred in most applications, which can be achieved through increasing mirror sizes. However, this can sacrifice other performances, such as the speed that the mirrors are operating at. For example, systems using a single mirror to provide light steering (e.g., in a single axis) would require a relatively high actuation force to achieve a target FOV and a target dispersion, which can reduce reliability. Furthermore, to reduce dispersion, the size of the mirror can be made to match the width of the light pulses (e.g., light columns) from the light source, which can lead to an increased mass and inertia of the mirror. As a result, a larger actuation force (e.g., torque) may be needed to rotate the mirror to achieve the target FOV. Subjecting MEMS actuators to large activation forces can require significantly power resources and can shorten the lifespan and reduce the reliability of the actuators. In some cases, it may not be possible to move the mirror at a desired rate and range in fast scanning scenarios using MEMS actuators due to the mass and inertial characteristics of the large mirror(s).

A solution to this problem, as presented herein, is to use a MEMS-based mirror arrays (see, e.g., FIG. 3) to replace the large mirror apparatus. In such cases, the size and mass of the individual mirrors can be significantly smaller and lighter so that a higher scanning speed (using less power) can be achieved. Individually, a smaller mirror size can significantly reduce the capability to deliver and receive light (e.g., LiDAR) pulses since less mirror surface area is available for light reflection. In contrast, an array of smaller MEMS micro-mirrors can be configured in any suitable dimension to effectively achieve a larger mirrored area of reflection (e.g., which may be comparable to the single large mirror or larger), but with the myriad benefits including faster individual mirror tilt control and at a reduced power consumption.

In order for an array of mirrors to operate collectively as a similarly sized single mirror, each individual mirror in the array needs to be synchronized so that at any point in time all of the mirrors in the array are oriented (also referred to as tilted) toward the same direction. Otherwise, light pulses striking the array of micro-mirrors may be dispersed in multiple directions, resulting in poor performance (e.g., tracking) characteristics, as would be appreciated by one of ordinary skill in the art with the benefit of this disclosure. In an ideal MEMS-based system where every mirror in the array is identically fabricated, a synchronized movement of each mirror of the array (e.g., via actuators coupled to each mirror) could theoretically be achieved as long as the driving signal applied to each mirror is identical. However, due to variations in the manufacturing and fabrication process, the mirrors may have slightly different masses and/or dimensions, such that an identical driving signal applied to each mirror can result in slightly different responses and, for example, poor uniformity of the reflection across the array and corresponding poor dispersion properties.

Aspects of the invention are directed to solving the problem of synchronizing a movement (e.g., rotation) and orientation (tilt) of an array of mirrors in a MEMS-based micro-mirror array particularly where there may be micro-variations in mass and/or dimensions between each mirror of the array. Some of the techniques presented herein involve a mechanical coupling between mirrors to synchronize movement across the mirror array. In some embodiments, a multi-lever mechanical coupling mechanism (using multiple coupling elements) can be used to synchronize movement across an array of micro-mirrors, as shown and described below with respect to FIGS. 5A-6B. In further embodiments, a lever with a common mechanical connection (a coupling element) at each mirror can be used to mechanically synchronize mirror movement and orientation across the array, as shown and described below with respect to FIGS. 7A-8B. Although linear arrays and single axis embodiments are presented herein, it should be understood that two-dimensional arrays of mirrors using multiple couple elements can be used for two-dimensional movement and/or multi-array control, as further discussed below.

Typical System Environment for Certain Embodiments

FIG. 1 shows a vehicle 100 utilizing a LiDAR-based detection system, according to certain embodiments. Vehicle 100 can include a LiDAR module 102. LiDAR module 102 can enable vehicle 100 to perform object detection and ranging in a surrounding environment. Based on the result of object detection and ranging, vehicle 100 can, for example, maneuver to avoid a collision with the object. LiDAR module 102 can include light steering module 104 and a receiver 106. Light steering module 104 can be configured to project one or more light pulses 108 at various directions at different times in any suitable scanning pattern, while receiver 106 can monitor for a return light pulse 110 which is generated by the reflection of light pulse 108 by an object 112. LiDAR module 102 can detect the object based on the reception of light pulse 110, and can perform a ranging determination (e.g., a distance of the object) based on a time difference between light pulses 108 and 110, which may be referred to as a time-of-flight (TOF). As indicated above, this operation can be repeated very rapidly over any desired range. In some cases, scanning (e.g., pulse emission and detection) may be performed over 360 degrees over a two-dimensional (2D) plane for ground-based vehicles (as vehicle detection systems may be primarily concerned with objects and environmental features on the ground), or over a three dimensional (3D) volumetric area.

In some embodiments, a spinning mirror system (e.g., LiDAR module 102) may be used that can allow a single laser to aim over 360 degrees at a high rate of rotation (e.g., 500-5000 RPMs or more) over a single plane to form a collection of points (e.g., each point being an individual measurement such as one sent and reflected pulse) that are dynamically and continuously updated in real-time, forming a "point cloud." The point cloud data can be used to estimate, for example, a distance, dimension, and location of the object relative to the LiDAR system, often with a very high fidelity (e.g., within 2 cm). In some cases, a third dimension (e.g., height) may be performed in a number of different manners. For example, the spinning mirror system (or other suitable apparatus) can be moved up and down (e.g., on a gimbal or other actuating device) to increase the field of view (FOV) of the scan. Although not shown or discussed further, it should be understood that other LiDAR systems may be used to develop a point cloud and may incorporate the novel aspects of the various threshold-adjusted detection schemes described herein. For example, some scanning implementations may employ solid state, flash-based LiDAR units that can be configured to scan a 2D focal plane area. One of ordinary skill in the art with the benefit of this disclosure would appreciate the many alternative embodiments and modifications thereof.

Referring back to FIG. 1, LiDAR module 102 can transmit light pulse 110 (send signal) at a direction directly in front of vehicle 100 at time T1 and receive light pulse 110 (return signal) reflected by an object 112 (e.g., another vehicle) at time T2. Based on the reception of light pulse 110, LiDAR module 102 can determine that object 112 is directly in front of vehicle 100. Moreover, based on the time difference between T1 and T2, LiDAR module 102 can also determine a distance 114 between vehicle 100 and object 112, and may glean other useful information with additional received pulses including a relative speed and/or acceleration between the vehicles and/or dimensions of the vehicle or object (e.g., the width of the object in 2D, or a height and width (or portion thereof depending on the FOV) with 3D detection. Thus, vehicle 100 can adjust its speed (e.g., slowing or stopping) to avoid collision with object 112, or modulate systems such as adaptive cruise control, emergency brake assist, anti-lock braking systems, or the like, based on the detection and ranging of object 112 by LiDAR module 102.

Figure 2:
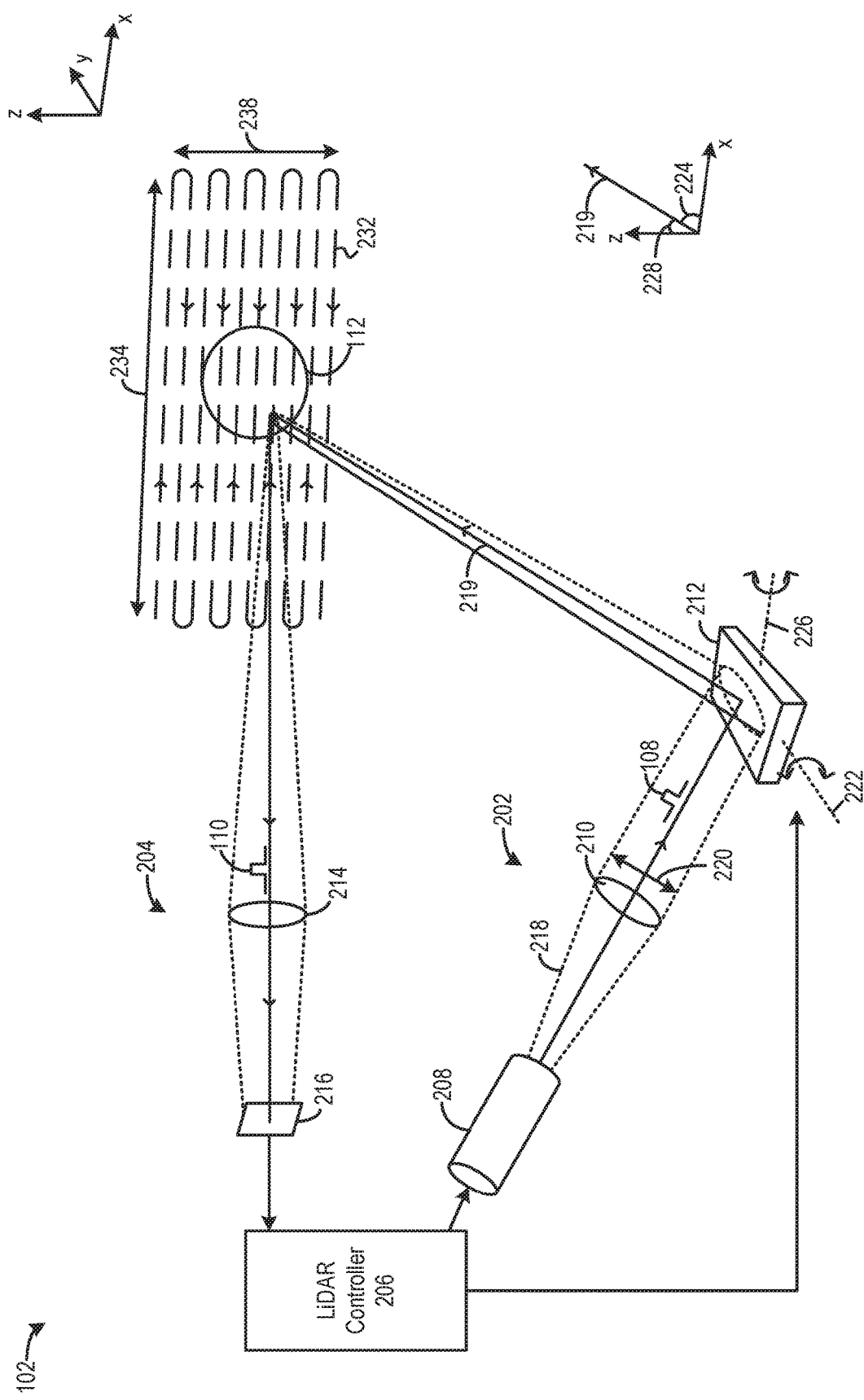
FIG. 2 shows an example of a light steering using a LiDAR based system, according to certain embodiments.

FIG. 2 illustrates an example of internal components of a LiDAR module 102. LiDAR module 102 may include a light steering transmitter 202, a receiver 204, and a LiDAR controller 206, which can control the operations of light steering transmitter 202 and receiver 204. Light steering transmitter 202 can include a pulsed light source 208, a collimator lens 210, and a mirror assembly 212, whereas receiver 204 can include a lens 214 and a photodetector 216. LiDAR controller 206 can control pulsed light source 208, which can include a pulsed laser diode, to transmit light pulse 108, which is part of pulsed light 218. Pulsed light 218 can disperse upon leaving pulsed light source 208 and can be converted into collimated/parallel pulsed light 218 by collimator lens 210. Collimator lens 210 can have an aperture length 220, which can set a width of collimated pulsed light 218.

Collimated pulsed light 218 can be incident upon mirror assembly 212, which can reflect collimated pulsed light 218 to steer it along a output projection path 219 towards object 112. Mirror assembly 212 can include one or more rotatable mirrors. FIG. 2 shows mirror assembly 212 as having one mirror, but as described below, certain embodiments include a mirror assembly 212 with a plurality of mirrors configured in one or more arrays, as shown and described with respect to FIGS. 3-8. Referring back to FIG. 2, in order to reduce the dispersion of collimated pulsed light 218 along output projection path 219, the one or more rotatable mirrors can have a length (or width) that matches aperture length 220, which can set the width of collimated bundle of pulsed light 218. Such arrangement enables mirror assembly 212 to reflect and project a larger portion of collimated bundle of pulsed light 218 towards the far field to mitigate the dispersion effect experienced by the reflected light en route to the far field.

Mirror assembly 212 further can include one or more coupling elements (not shown in FIG. 2) to mechanically rotate the rotatable mirrors in a synchronized fashion along a first axis 222 and, in some cases, a second axis 226. The coupling elements can be controlled by one or more MEMS actuators (not shown in FIG. 2). As further described below, the rotation around first axis 222 can change a first angle 224 of output projection path 219 with respect to a first dimension (e.g., the x-axis), whereas the rotation around second axis 226 can change a second angle 228 of output projection path 219 with respect to a second dimension (e.g., the z-axis). LiDAR controller 206 can control the actuators to produce different combinations of angle of rotations around first axis 222 and second axis 226 such that the movement of output projection path 219 can follow a scanning pattern 232. A range 234 of movement of output projection path 219 along the x-axis, as well as a range 238 of movement of output projection path 219 along the z-axis, can define a FOV. An object within the FOV, such as object 112, can receive and reflect collimated pulsed light 218 to form reflected pulse to form light pulse 110, which can be received by receiver 204.

MEMS-Based Micro-Mirror Arrays

In the embodiments that follow, a number of micro-electro-mechanical systems (MEMS) are presented that include micro-mirror array structures that can be integrated with the LiDAR systems described above. MEMS can be described as a miniature mechanical and electro-mechanical elements (e.g., sub-micron to mm dimensions) that can be formed into various devices and structures using microfabrication techniques. MEMS devices can vary in complexity from simple static structures with no moving elements, to highly complex electromechanical systems with moving elements that can be controlled by integrated microelectronics. Some of the moving, functional elements can include transducers such as micro-sensors and micro-actuators. In aspects of the present invention, micro-actuators may be used to actuate the coupling elements that mechanically couple and synchronize the micro-mirrors in an array, as further described below at least with respect to FIGS. 5A-8. In some embodiments, the MEMS micro-mirror arrays described herein can be integrated on a common silicon substrate, along with integrated circuits (e.g., microelectronics) that can include circuitry to control the micro-mirror array. Some typical fabrication processes can include complimentary metal-oxide semiconductor (CMOS) processes, Bipolar processes, Bipolar CMOS (BICMOS) processes, or the like. While single substrate embodiments are shown and described herein, it should be understood that multi-substrate systems (e.g., mirror arrays on different substrates) are possible, as would be appreciated by one of ordinary skill in the art with the benefit of this disclosure.

Compared with an arrangement where a light steering transmitter uses a single mirror having two axes of rotation to provide two ranges of projection angles to form a FOV (e.g., as shown in FIG. 2), some embodiments can use a first rotatable mirror and a second rotatable mirror (or an array of first rotatable mirrors and a second rotatable mirror) each having a single but orthogonal rotational axis to provide the two ranges of projection angles to form the FOV. Such arrangements can improve reliability and precision and can reduce actuation power, while providing the same or superior FOV and dispersion.

Figure 3:
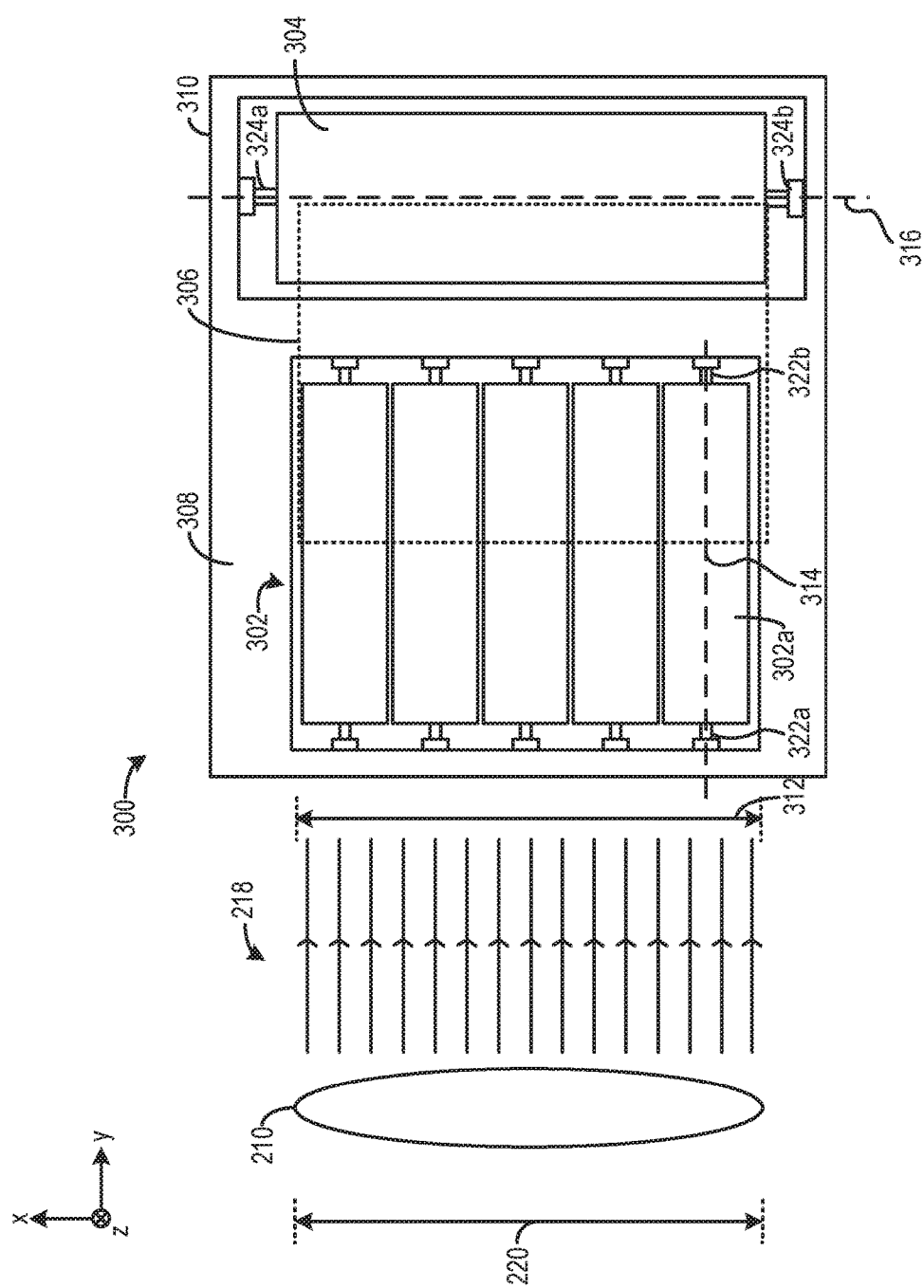
FIG. 3 shows an example of a MEMS-based micro-mirror assembly in a LiDAR-based system, according to certain embodiments.
Figure 4:
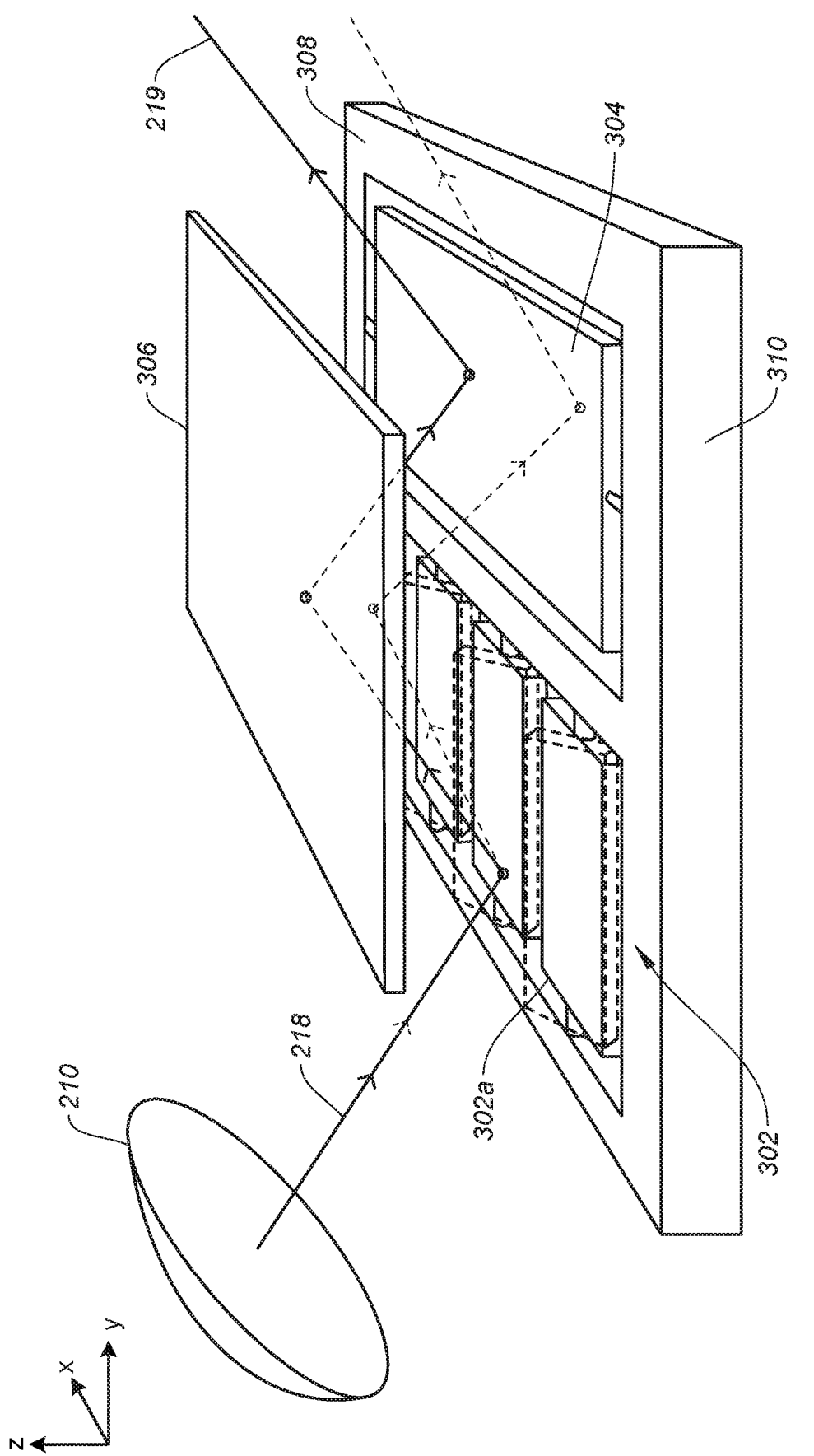
FIG. 4 shows an example of an operation of the micro-mirror assembly of FIG. 3 to provide a two-dimensional field of view (FOV), according to certain embodiments.

FIGS. 3-4 show an example of a mirror assembly 300, according to certain embodiments. Mirror assembly 300 can be part of light steering transmitter 202. FIG. 3 shows a top view of mirror assembly 300 and FIG. 4 shows a perspective view of mirror assembly 300. Mirror assembly 300 can include an array of first rotatable mirrors 302(*a*), a second rotatable mirror 304, and a stationary mirror 306. The array of first rotatable mirrors 302(*a*) and second rotatable mirror 304 can be MEMS devices implemented on a surface 308 of a semiconductor substrate 310. Stationary mirror 306 can be positioned above semiconductor substrate 310. Referring to FIG. 4, in some configurations, array of first rotatable mirrors 302(*a*) can receive collimated pulsed light 218 from collimator lens 210, reflect pulsed light 218 towards stationary mirror 306, which can reflect pulsed light 218 towards second rotatable mirror 304. Second rotatable mirror 304 can reflect pulsed light 218 received from stationary mirror 306 as an output along output projection path 219 (represented by dotted line that is co-linear with reflected light pulsed light 218). To illustrate how the pulsed light can be deflected, mirrors 302(*b*) show mirrors 302(*a*) in a rotated state. In such case, first rotatable mirrors 302(*b*) can receive collimated pulsed light 221 from collimator lens 210, reflect pulsed light 221 towards stationary mirror 306, which can reflect pulsed light 221 towards second rotatable mirror 304. Second rotatable mirror 304 can reflect pulsed light 221 received from stationary mirror 306 as an output along output projection path 222, which may not be co-linear with pulsed light 221, as would be appreciated by one of ordinary skill in the art with the benefit of this disclosure. In another configuration (not shown in the figures), second rotatable mirror 304 can receive collimated pulsed light 218 from collimator lens 210 and reflect pulsed light 218 towards stationary mirror 306, which can reflect pulsed light 218 towards array of first rotatable mirrors 302(*a*). Array of first rotatable mirrors 302(*a*) can reflect pulsed light 218 as an output along output projection path 219. As to be describe in details below, array of first rotatable mirrors 302(*a*) and second rotatable mirror 304 change an angle of output projection path 219 with respect to, respectively, the x-axis and the z-axis, to form a two-dimensional FOV.

In some embodiments, each mirror of the array of first rotatable mirrors 302(*a*) (e.g., first rotatable mirror 302(*a*)) can be rotatable around a first axis 314, whereas second rotatable mirror 304 can be rotatable around a second axis 316 which is orthogonal to first axis 314. Each mirror of the array of first rotatable mirrors 302(*a*), as well as second rotatable mirror 304, can be coupled with a pair of rotary actuators, such as comb drives, to rotate the mirror. For example, first rotatable mirror 302(*a*) is coupled with and rotary actuators 322*a* and 322*b*, whereas second rotatable mirror 304 is coupled with rotary actuators 324*a* and 324*b*. Each of first rotatable mirror 302(*a*) (and the rest of array of first rotatable mirrors 302(*a*)) and second rotatable mirror 304 can independently move output projection path 219 along, respectively, the x-axis and the z-axis, to form a FOV. In some embodiments, coupling elements may be used to mechanically couple each mirror in an array together. For instance, adjacent mirrors in an array may be mechanically coupled together along the entire array, as shown in FIG. 5, or the entire array (or portion thereof) can be coupled together via a single coupling element, as shown in FIG. 7. In some cases, the rotary actuators 324*a*, 324*b*, may rotate the mirrors along an axis in a synchronized fashion, and the coupling elements may further mechanically synchronize the movement of the array of mirrors, which can improve the accuracy and synchronization since moving each mirror in the array via the actuators alone may be subject to small variations due to fabrication tolerances and the like, as described above. Alternatively, the coupling elements as described below with respect to FIGS. 5A-8 may solely control the rotation of the micro-mirror elements in an array in lieu of the rotary actuators. Although not shown in FIGS. 3 and 4, the coupling elements described below would be generally configured perpendicular to the axis 314, 316 in the corresponding mirror array, as further described below.

Compared with a single mirror assembly, mirror assembly 300 can provide similar or superior FOV and dispersion performance while reducing the actuation force and power and improving reliability. First, each mirror of the array of first rotatable mirrors 302(*a*), as well as the second rotatable mirror 304, can be substantially smaller than a single mirror having a comparable length and width and dispersion performance. As a result, each mirror of mirror assembly 300 may use substantially less torque to provide the same FOV as the single mirror assembly. The torque can be further reduced by independently optimizing the control signals responsible for each dimension of the FOV. For example, second rotatable mirror 304 of mirror assembly 300 can be driven at close to a natural frequency to induce harmonic resonance, which can substantially reduce a required torque to achieve a target FOV. The reduction of torque also reduces the burden on the rotary actuators and corresponding coupling elements, and can increase their operational lifespan and reduce wear-and-tear. In addition, as a plurality of mirrors are involved in the steering of light, the likelihood of any of the mirror becoming a single source of failure can be mitigated, which can further improve reliability. The novel embodiments described herein (e.g., as presented in FIGS. 5A-8B) may be applied to any LiDAR system presented in the family of cases that are incorporated by reference.

Synchronizing MEMS Micro-Mirror Arrays using Mechanical Coupling Elements

FIGS. 5A-5F show a first type of coupled, synchronous linear array of micro-mirrors 500 in a MEMS system, according to certain embodiments. Micro-mirror array 500 can be integrated in a larger MEMS structure, such as in the mirror assembly 300 of FIG. 3, in which case micro-mirror array 500 can correspond to array 302. As described above, conventional micro-mirror array structures in MEMS architectures are often individually controlled by one or more actuators. Synchronizing the orientation of each mirror in the array can be problematic when there are variations in the fabrication process (e.g., semi-conductor process tolerances) that may result in slightly mismatched micro mirror mass and/or dimensions, variation in actuator performance (e.g., identical voltages on different actuators may yield slightly different performance), or the like. Such variations can ultimately manifest as non-uniformly aligned (i.e., unsynchronized) mirrors, which can result in degraded performance characteristics including poor signal dispersion and/or collecting light from different sources, rather than from a single location (which can be desirable for object detection).

In the following MEMS micro-mirror arrays, actuators configured on the mirror axes (e.g., like actuators 322*a* and 322*b*) are not shown in detail, but their locations are shown and their operation in the context provided would be appreciated by one of ordinary skill in the art with the benefit of this disclosure. Each micro-mirror (also referred to herein as "mirror," "mirror element," and "micro-mirror element") can be rotatable (tiltable) on an axis (see, e.g., axis 314) and each mirror in the array (or a subset thereof) can be mechanically coupled by a coupling element, as further described below. In some embodiments, MEMS actuators may cause the mirrors to rotate and the mechanically coupled, coupling element may force the mirrors to maintain synchronization. For example, small differences in mirror mass/dimensions or actuator control tolerances can be mitigated (e.g., reduced or eliminated) by a "brute force" approach by way of the mechanical coupling elements. In other embodiments, the mirrors may be rotated solely by way of a movement of the coupling elements. For example, the coupling elements of FIGS. 5A-6B may be controlled by a MEMS actuator(s) (e.g., by an actuator configured at pivot 565 on coupling element support 560, as further described below), which may solely control the rotation of each mirror in the mirror array. Alternatively or additionally, some embodiments may incorporate both control schemes (e.g., utilizing individual mirror actuators and controlling a coupling element). Put simply, some system configurations may include (1) coupling elements (and corresponding coupling element actuators) configured to mechanically rectify/maintain synchronization between mirror elements by supplementing actuators that control the rotation of the mirror elements themselves; or (2) the coupling elements (and their actuators) may control mirror array rotation in lieu of the mirror actuators. Although the following images (FIGS. 5A-8B) may show mirrors, coupling elements, support frames, etc., having particular dimensions, it should be understood that other dimensions are possible including wider and/or longer mirrors, differently shaped mirrors, support structures, coupling elements, or any other structure shown throughout this disclosure. In some embodiments, for example, each of the plurality of mirror elements can be of the same size, dimensions, and/or mass. Although the mirror elements can be any shape, some embodiments may employ rectangular mirror elements with two opposing ends separated by a first distance defining a length and longitudinal arrangement of the corresponding mirror element and two opposing sides separated by a second distance defining a width of the corresponding mirror element, as shown in FIG. 3. One of ordinary skill in the art with the benefit of this disclosure would appreciate the many variations, modifications, and alternatively embodiments that are possible. To assist the reader in understanding the figure annotation convention, FIGS. 5A-8 use Arabic numerals (e.g., 1, 2, . . . n) to identify each mirror in the arrays, and the figures may incorporate the numerals to uniquely identify particular elements. For instance, axis 536(1) and axis 536(2) can correspond to the axes in mirrors 1 and 2, respectively. It should be noted that although the embodiment shown and described herein generally apply to vehicles, it should be understood that said techniques may also apply in applications and disciplines, including medical diagnostic devices (e.g., an endoscope using a mirror array to redirect light), land surveying, and more.

Figure 5A:
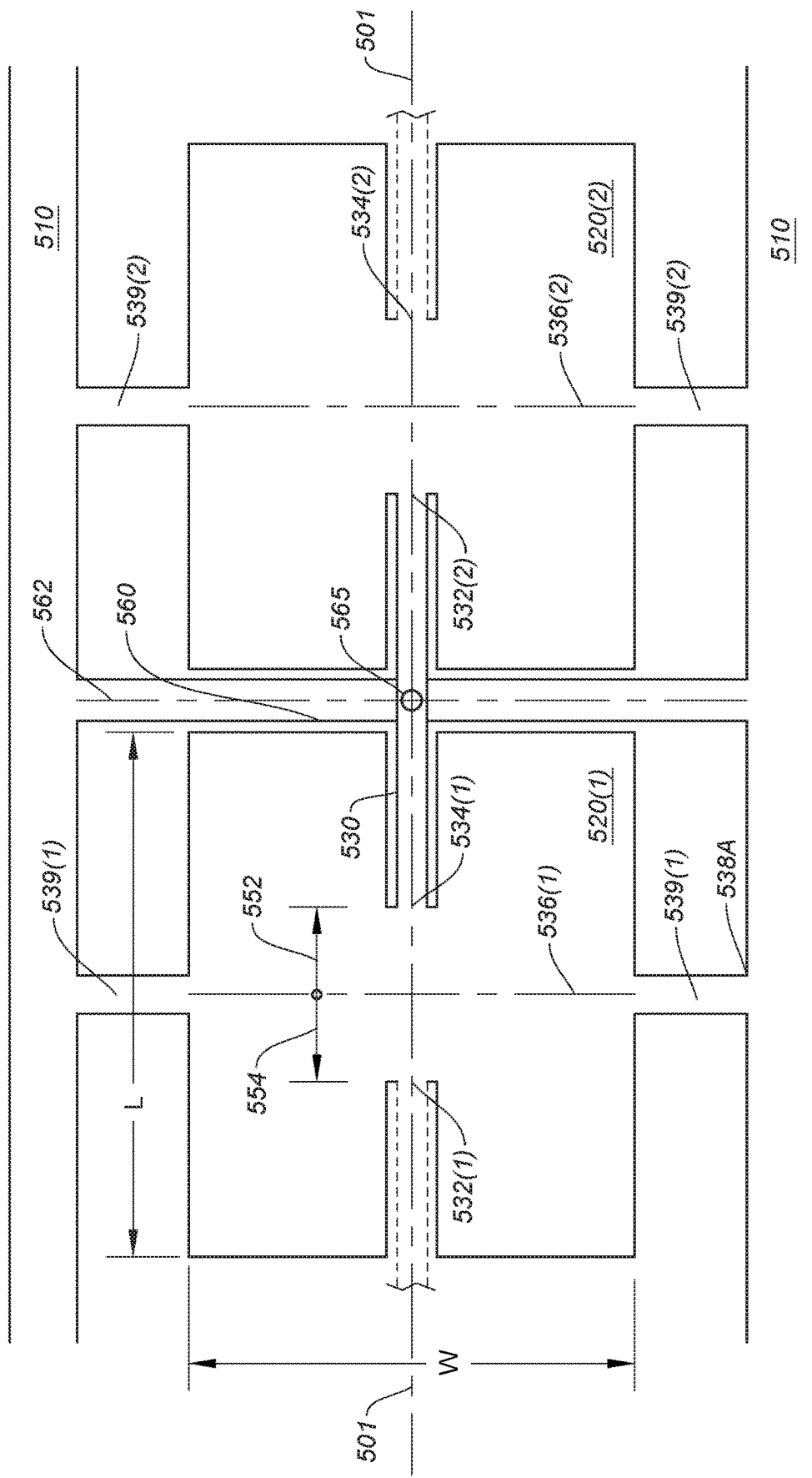
FIGS. 5A-FIG. 5F show a first type of coupled, synchronous linear array of micro-mirrors operating over a range of motion, according to certain embodiments.
Figure 5B:
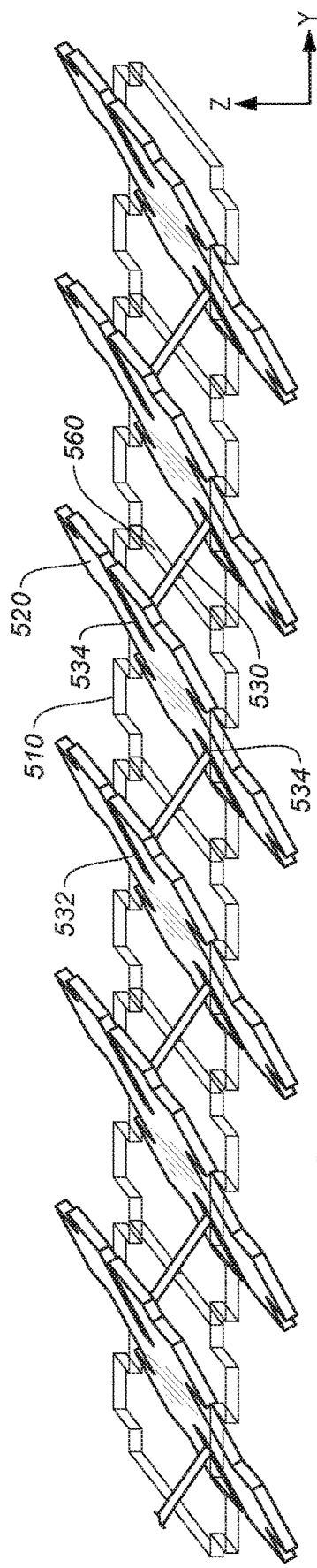
Figure 5C:
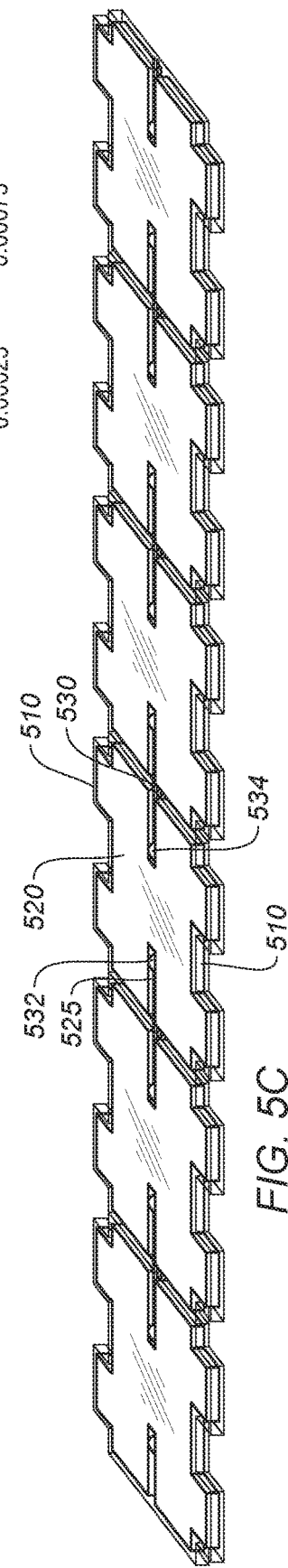
Figure 5D:
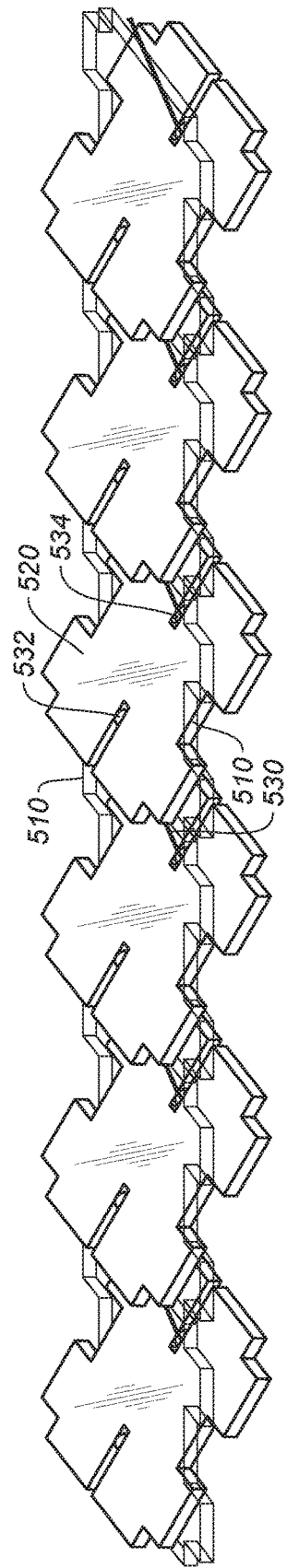

Referring to FIG. 5A, only two mirrors of the first type of coupled, synchronous linear array of micro-mirrors 500 in a MEMS system is shown, although any number of mirrors can be employed. For instance, FIG. 3 shows 4 mirrors in a linear array, FIG. 4 shows 3 mirrors in a linear array, and FIGS. 5B-D show six mirrors in a linear array. More or fewer mirrors can be used, as well as multiple linear arrays of mirrors. Although the mirrors shown herein rotate along a single axis (e.g., axis 536), it should be understood that some embodiments may incorporate mirrors with two axes or rotation across a one or two dimensional array. The techniques and structures described herein may be applied in dual axle embodiments, as would be appreciated by one of ordinary skill in the art with the benefit of this disclosure.

In FIG. 5A, micro-mirror array 500 can include a support frame 510 and a plurality of mirror elements 520 disposed in a linear array in an end-to-end, longitudinally configured arrangement within the support frame. The plurality of mirror elements are defined by a length L and width W, where the longitudinal arrangement corresponds to mirror elements linearly aligned along line 501, as shown. The plurality of elements in FIG. 5A include a first mirror element 520(1) and a second mirror element 520(2), where the second mirror element is adjacent to and linearly aligned with the first mirror element 520(1) (e.g., co-linear with line 501). Each of the plurality of mirror element 520 can be rotatable on a rotational axis 536 that is perpendicular to a line (e.g., line 501) defined by the linear array of the plurality of mirror elements. For example, rotational axis 536 for each mirror element can be parallel with the line defining the width W. In some cases, the rotational axis 536 of each mirror element can bisect the corresponding mirror element into a first portion 524 and a second portion 522 (e.g., or the right half and left half of mirror 520, respectively, as shown). In some embodiments, one or more coupling elements may be used to mechanically attach some or all of the plurality of mirror elements together to facilitate a mechanically induced synchronized rotation of the plurality of mirror elements. In such cases, the coupling elements may be driven by an actuator that causes the coupling element to rotate on a pivot point 565 on a coupling element support 560 that also defines the axis of rotation 562 for the coupling element. In other words, support frame 510 may include a support structure 560 that is configured perpendicular to the linear array (perpendicular to line 501 and parallel to axis 536) and at a location between the first and second mirrors, where the support structure 560 supports the coupling element 530 at a pivot point 565, and where the coupling element 530 rotates at the pivot point 565. An axle, hinge, or other mechanical and/or electromechanical element can be used to rotate the mirror elements on rotational axis 536. Alternatively or additionally, one or more actuators (controlled by one or more processors of a LiDAR system, as described above) may cause the mirror to be rotated.

In FIG. 5A, coupling element 530 can have a proximate end coupled to a first portion 524(1) of the first mirror element 520(1) at a first coupling location 534(1) and a distal end coupled to a second portion 522(2) of the second mirror element 520(2) at a second coupling location 532(2), whereby the coupling element physically couples the first and second mirror elements such that a rotation of the first mirror element causes a synchronous and equal rotation of the second mirror element, and a rotation of the second mirror element causes a synchronous and equal rotation of the first mirror element. It follows that additional mirror elements can be included in the array, as described above. In the case of a third mirror element being added to array 500, the third mirror element may be configured adjacent to and linearly aligned with the second mirror element (e.g., referring to FIG. 5A, to the right of and in line with mirror 520(2)). A second couple element can be incorporated to mechanically and physically link the third mirror element to the first and second mirror elements. The second coupling element may have a distal end coupled to a first portion 524(2) of the second mirror element 520(2) at a first coupling location 534(2), and a proximal end coupled to a second portion 522(3) of the third mirror element 520(3) at a second coupling location 532(3), whereby the coupling element physically couples the second and third mirror elements such that a rotation of the third mirror element causes a synchronous and equal rotation of the first and second mirror elements. More mirror elements N and corresponding coupling elements M can be added in a similar manner, as would be appreciated by one of ordinary skill in the art with the benefit of this disclosure.

The first and second coupling locations 532, 534 for mirror element 520(1) (as well as the other mirror elements in the array) can be configured to be equidistant from and on opposite sides of rotational axis 536(1). For example, both first and second coupling locations can be equal distances 552 and 554 from rotational axis 536. By way of example, the micro mirrors may be approximately 1 mm in length with the coupling locations being approximately 0.2 mm (in opposite directions) from rotational axis 536, although other locations are possible (e.g., 0.1 mm, 0.3 mm, etc.). Equidistant coupling locations can help synchronize the rotation of multiple mirror elements in the array. Non-equidistant coupling locations on any mirror in the array may cause that mirror to rotate at a different, non-synchronous rate and amount, as would be appreciated by one of ordinary skill in the art with the benefit of this disclosure.

In some cases, the coupling locations may provide pivot/rotation point for the coupling element. For example, as shown in FIGS. 5B-5D, the coupling element rotates in position at the coupling locations. The axis of rotation for the coupling elements can be configured perpendicular to rotational axis 536 of the corresponding mirror element. Support structure 510 may include coupling element support 560 that supports the coupling elements 530 at a pivot point 565. Support structure 510 may be configured along axis 562 and the coupling element may rotate on this axis. Support structure 510 is shown as a lattice or trellis type structure, however support structure 510 can be configured in any suitable manner such that the array of micro-mirrors 520 can be disposed within it and operated over an unobstructed range of motion (e.g., see surface 308 of FIG. 3). One or more actuators may be disposed at pivot point 565 to control the rotation of the coupling element at any of one or more of the mirror elements in the array. In some cases, the range of motion for each mirror can be up to 180 degrees. Some embodiments may utilize ranges of motion closer to 90 degrees, although other suitable ranges of motion are possible. Likewise, the range of motion for the coupling elements at the coupling locations may range anywhere from approximately 45-90 degrees, also ranges larger or smaller are possible. In some implementations, the range of motion (i.e., rotational range of each mirror element on its corresponding rotation axis) may be influenced, in part, by the dimensions of the coupling element in relation to the mirror element, as would be appreciated by one of ordinary skill in the art with the benefit of this disclosure.

In some embodiments, support hinges 539(1) and 539(2) can couple their corresponding mirror elements to support frame 510. The support hinges may be configured along the corresponding rotational axis for the mirror element they are coupled to and may facilitate the rotation of the first and second mirror elements along the rotation axis. The support hinges can be flexible (e.g., a torsional bar) that can be deformed as the mirror elements rotate. In some cases, the support hinges, the support frame, the mirror elements, and the coupling elements can be a continuous, unitary structure with a common substrate (e.g., semiconductor substrate). For example, the said structures may be formed (e.g., etched, photolithography, etc.) via a semiconductor fabrication process and may be one unitary structure formed on a common plane, as shown for example in FIGS. 5A, 5E-F, 7A, and 7E. Typical dimensions are shown in FIGS. 5B-5D (millimeter range), but other dimensions are possible.

Channels 532, 534 can be formed in the mirror to allow the coupling element to pivot above and below the mirror element during operation (e.g., mirror rotation/tilting). In other words, the channel can be configured to allow the coupling element to pass through as the first and second mirror elements are rotated. Although a straight channel is shown, any suitable shape or dimension can be used that provides an unimpeded pathway for the coupling element as a corresponding mirror element is rotated. Coupling elements may be coupled to mirror elements in any suitable manner (e.g., micro-hinges, integrated with the mirror element, etc.). As shown in FIG. 5A, coupling element 530 can be part of the unitary structure as described above.

As described above, a MEMS apparatus can include a number of actuators to rotate/orient the individual micro-mirrors in the array, to control the coupling element(s) (e.g., rotating control elements at pivot point 565 on coupling element support 560), or both. In some cases, one or more processors may be coupled to (from an external computing device) or integrated (e.g., fabricated on the same common semiconductor substrate) with mirror assembly 300. The one or more processors can be configured to control the MEMS actuators (also referred to as "motors" or "micro-motors") that can be configured to drive the rotation the micro-mirrors at their rotational axis (e.g., at or near 538A), to drive each coupling element that causes the plurality of mirror elements to synchronously and equally rotate over a range of motion, or both. FIGS. 5B-5D illustrate how, in some embodiments, the micro-mirror array operates as the mirrors are rotated over a range of motion in a synchronous fashion, as described above.

Figure 5E:
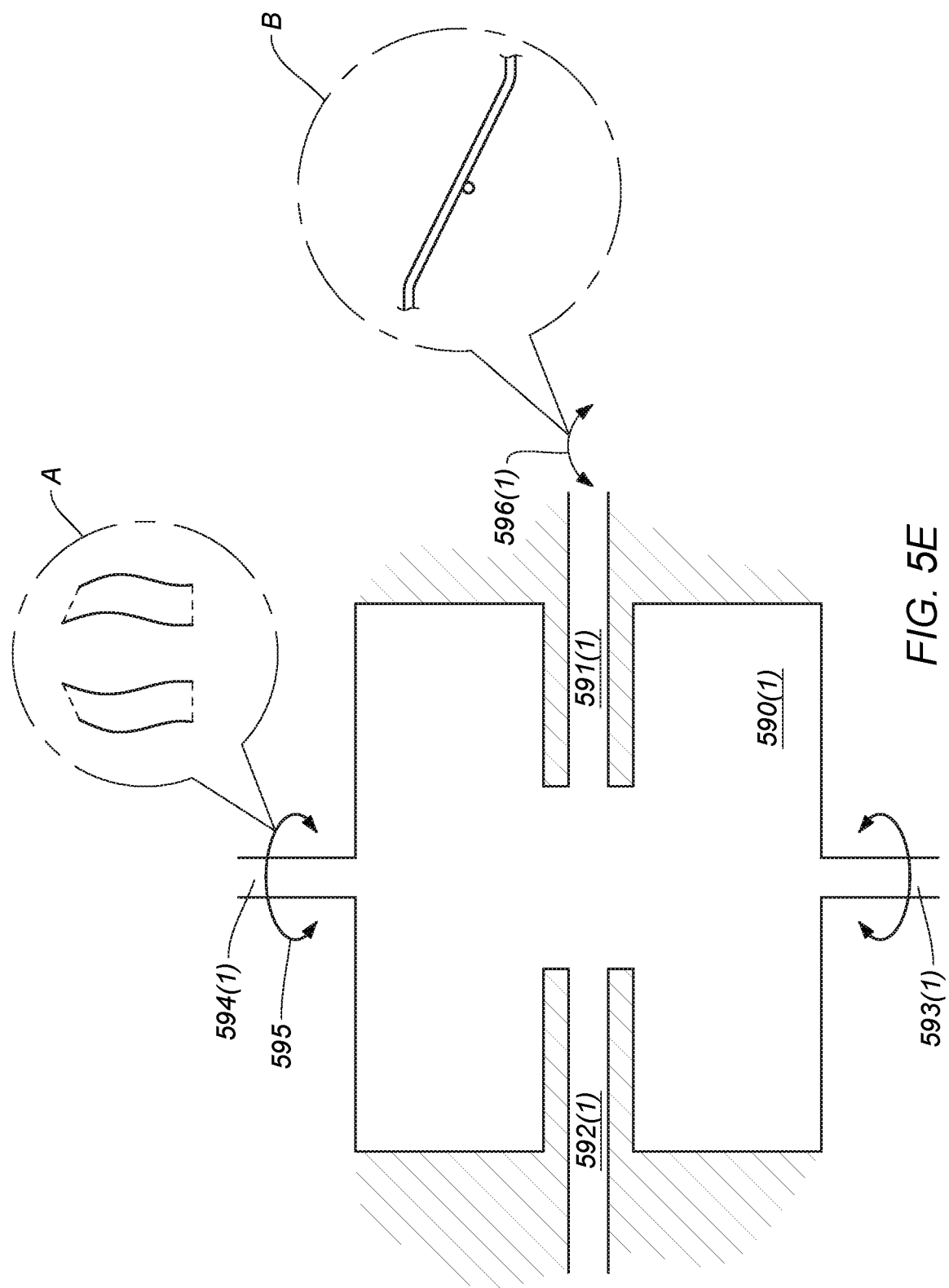
Figure 5F:
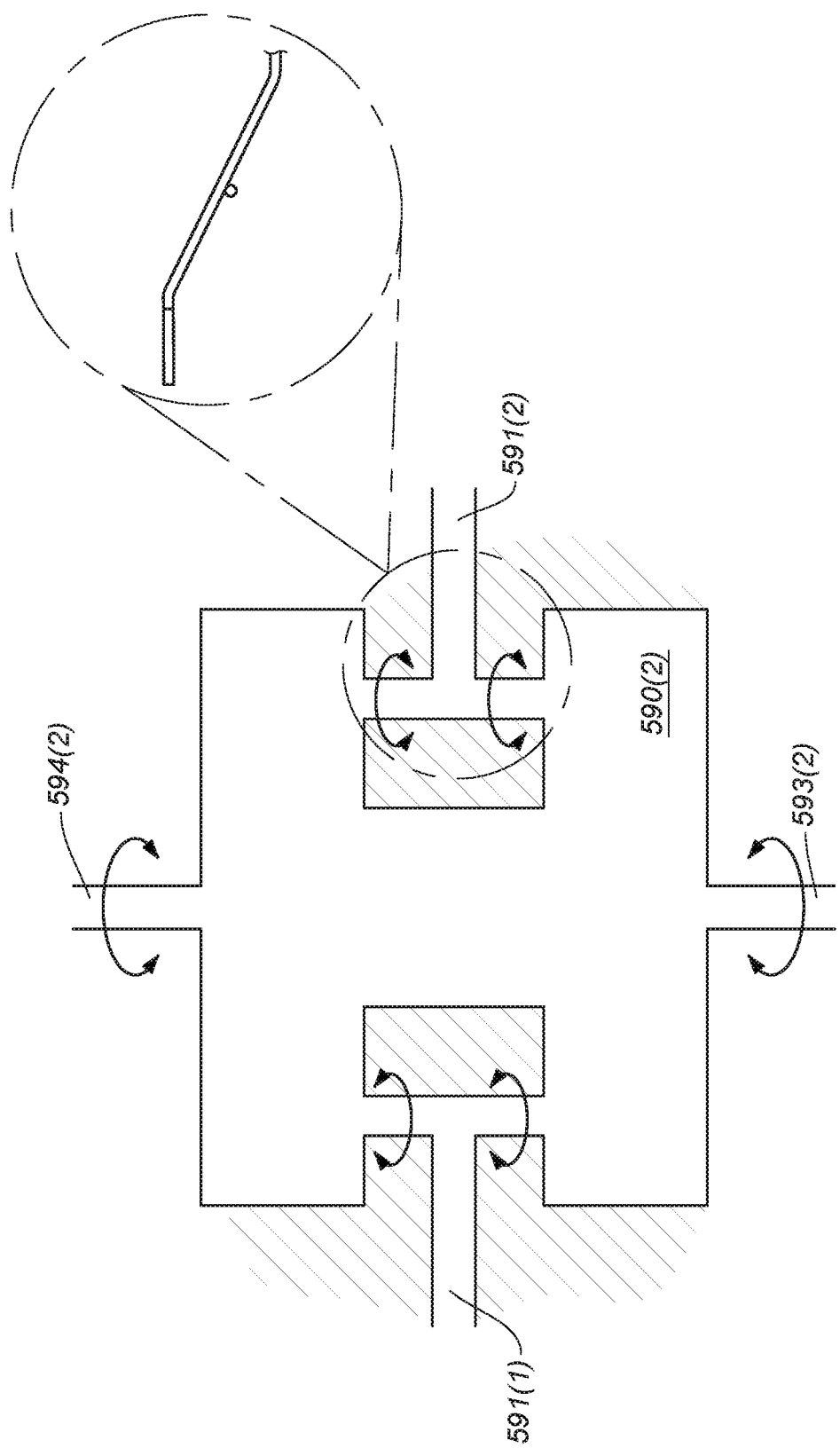

FIG. 5E shows an example of a unitary mirror element with integrated coupling elements and hinge structures. These structures can be configured on a same plane (as shown), or different planes. The manner in which the hinge structures and coupling elements can flex are shown, for example, in callout box A and B, respectively. Callout box B shows how the coupling element can rotate on a coupling element support structure ("coupling element support"), as further described below. In such cases, the coupling element support may also be part of the unitary structure and fabricated in the same manner. FIG. 5F shows another embodiments of a mirror structure with a different method of forming the coupling elements. The callout box and arrows in FIG. 5F show how the coupling elements and hinge supports may rotate and flex when the mirror elements are rotating.

FIGS. 6A-6B show simplified functional diagrams of the coupled, synchronous linear array of micro-mirrors shown in FIGS. 5A-5C, according to certain embodiments. Particularly, FIG. 6A shows the mirror elements synchronously rotated at a first deflection angle (e.g., positive deflection of approximately 45 degrees), and FIG. 6B shows the mirror elements synchronously rotated at a second deflection angle (e.g., negative deflection of approximately (−) 45 degrees). In FIG. 6A, as mirror 520(1) rotates to the first deflection angle, coupling element 530 causes the other mirrors in the array to rotate equally and synchronously, as described above. That is, each mirror 520 can rotate on its corresponding axis 536. Each coupling element 530 can couple to each mirror 520 at a coupling location (532, 534) that, for each mirror, is typically equidistant from the axis of rotation 536 for that mirror. The coupling element may rotate on an axis 562 at a pivot point 565 that may be supported, for example, by a coupling element support 560. One or more (integrated) MEMS actuators may be configured on axis 536 to rotate the mirror element, at pivot point 565 to rotate the coupling element, or any combination thereof In some cases, a subset of the mirrors (e.g., less than that total number of mirrors in the array) may have actuators or active actuators configured to rotate the mirrors. In certain embodiments, a subset (e.g., less than that total number of coupling elements in the array) of the coupling elements (e.g., less than that total number of coupling elements in the array) may have actuators or active actuators configured to rotate the coupling elements. Although the range of motion (e.g., range of rotation of mirrors and coupling elements) is shown to be about 90 degrees in total (e.g., +/−45 degrees), other ranges are possible, as would be appreciated by one of ordinary skill in the art with the benefit of this disclosure.

FIGS. 7A-7D show a second type of coupled, synchronous linear array of micro-mirrors 700 in a MEMS system, according to certain embodiments. Micro-mirror array 700 can be integrated in a larger MEMS structure, such as in the mirror assembly 300 of FIG. 3, in which case micro-mirror array 500 can correspond to array 302. Rather than having an array of coupling elements that individually couple successive pair of mirrors together in the manner described above with respect to FIGS. 5A-6B, certain embodiments of FIGS. 7A-8B employ a single coupling element across multiple mirror element that operate in a manner that is analogous to window blinds with a plurality of louvers where actuating a single rod can change the orientation of all of the louvers in the set (e.g., from a closed to an open position).

Referring to FIG. 7A, only two mirrors of the first type of coupled, synchronous linear array of micro-mirrors 500 in a MEMS system is shown, although any number of mirrors can be employed. More or fewer mirrors can be used, as well as multiple linear arrays of mirrors. Although the mirrors shown herein rotate along a single axis (e.g., axis 736), it should be understood that some embodiments may incorporate mirrors with two axes or rotation across a one or two dimensional array. The techniques and structures described herein may be applied in dual axle embodiments, as would be appreciated by one of ordinary skill in the art with the benefit of this disclosure.

Figure 7B:
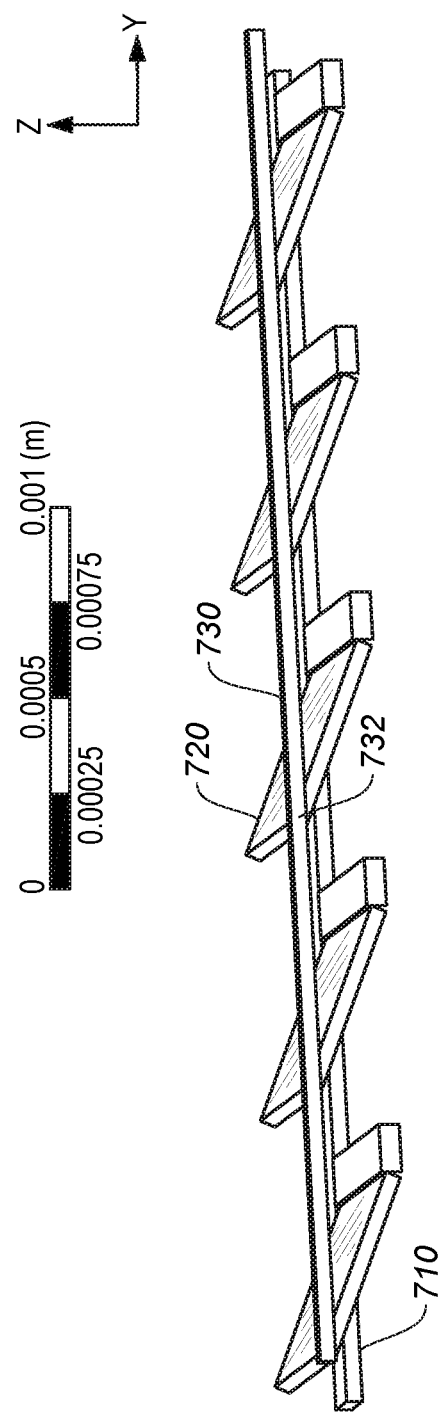
Figure 7C:
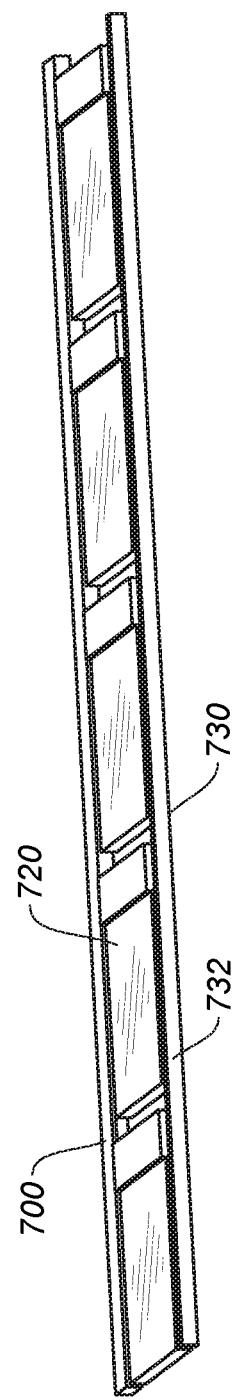
Figure 7D:
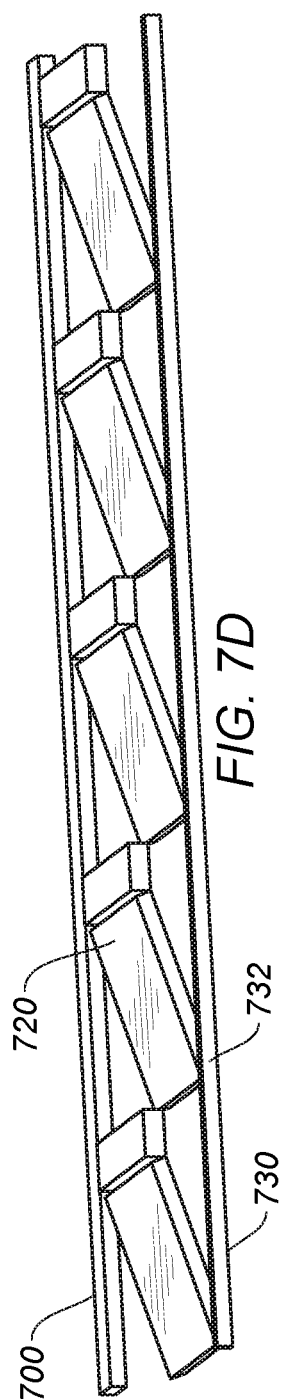

In FIG. 7A, micro-mirror array 700 can include a support frame 710 and a plurality of mirror elements 720 disposed in a linear array in an end-to-end, longitudinally configured arrangement within the support frame. The plurality of mirror elements are defined by a length L and width W, where the longitudinal arrangement corresponds to mirror elements linearly aligned along line 701, as shown. The plurality of elements in FIG. 7A include a first mirror element 720(1) and a second mirror element 720(2), where the second mirror element is adjacent to and linearly aligned with the first mirror element 720(1) (e.g., co-linear with line 501). Each of the plurality of mirror elements 720 can be rotatable on a rotational axis 736 that is perpendicular to a line (e.g., line 701) defined by the linear array of the plurality of mirror elements. For example, rotational axis 736 for each mirror element can be parallel with the line defining the width W. In some cases, the rotational axis 736 of each mirror element can bisect the corresponding mirror element into a first portion and a second portion, similar to the embodiments of FIGS. 5A-6B. Alternatively, a different rotational axis 736(b) may be configured closer to an edge, as shown in FIGS. 7B-D. In some embodiments, a coupling element may be used to mechanically attach some or all of the plurality of mirror elements together to facilitate a mechanically induced synchronized rotation of the plurality of mirror elements. In such cases, the coupling element may be driven by an actuator that causes the coupling element to rotate. Alternatively or additionally, the coupling element may not be driven by an actuator and the rotation of one or more mirrors by one or more actuators for the mirrors (e.g. 738A) may indirectly cause the coupling element to rotate, and due to its fixed and rotatable mechanical coupling with each of the mirror elements in the array (or a subset thereof), the other mirrors will equally and synchronously rotate in kind.

In FIG. 7A, coupling element 730 can be coupled to each of the mirror elements at a coupling location 732. The coupling location for each mirror element may be located at a same location such that, e.g., the coupling location 732(1) for mirror element 720(1) is the same distance from the mirror element axis of rotation 736(1) or 736(1)(B) as the coupling location 732(2) from mirror element 720(2) is from axis of rotation 736(2) or 736(2)(B). By way of example, the micro mirrors may be approximately 1 mm in length with the coupling locations being approximately 0.2 mm from rotational axis 536 or 0.6 mm from rotational axis 736(B).

In some cases, the coupling locations may provide pivot/rotation point for the coupling element. For example, as shown in FIGS. 7B-7D, the coupling element rotates in position at the coupling locations on an axis 762. The axis of rotation for the coupling element can be configured perpendicular to rotational axis 736 (or 736(b)) of the corresponding mirror element. Support structure 710 is shown as a lattice or trellis type structure, however support structure 710 can be configured in any suitable manner such that the array of micro-mirrors 720 can be disposed within it and operated over an unobstructed range of motion (e.g., see surface 308 of FIG. 3). In some cases, the range of motion for each mirror can be up to 180 degrees. Some embodiments may utilize ranges of motion closer to 90 degrees, although other suitable ranges of motion are possible. Likewise, the range of motion for the coupling elements at the coupling locations may range anywhere from approximately 45-90 degrees, also ranges larger or smaller are possible. In some implementations, the range of motion (i.e., rotational range of each mirror element on its corresponding rotation axis) may be influenced, in part, by the dimensions of the coupling element in relation to the mirror element, as would be appreciated by one of ordinary skill in the art with the benefit of this disclosure.

In some embodiments, support hinges can couple their corresponding mirror elements to support frame 710, as described above with respect to FIG. 5A. The support hinges may be configured along the corresponding rotational axis for the mirror element they are coupled to and may facilitate the rotation of the first and second mirror elements along the rotation axis. The support hinges can be flexible (e.g., a torsional bar) that can be deformed as the mirror elements rotate. In some cases, the support hinges, the support frame, the mirror elements, and the coupling elements can be a continuous, unitary structure with a common substrate (e.g., semiconductor substrate). For example, the said structures may be formed (e.g., etched, photolithography, etc.) via a semiconductor fabrication process and may be one unitary structure formed on a common plane, as shown for example in FIGS. 5A, 5E-F, 7A, and 7E. Typical dimensions are shown in FIGS. 5B-5D (millimeter range), but other dimensions are possible.

As described above, a MEMS apparatus can include a number of actuators to rotate/orient the individual micro-mirrors in the array, to control the coupling element, or both. In some cases, one or more processors may be coupled to (from an external computing device) or integrated (e.g., fabricated on the same common semiconductor substrate) with mirror assembly 300. The one or more processors can be configured to control the MEMS actuators (also referred to as "motors" or "micro-motors") that can be configured to drive the rotation the micro-mirrors at their rotational axis (e.g., at 731(1, 2)), to drive the coupling element (730) that causes the plurality of mirror elements to synchronously and equally rotate over a range of motion, or both. FIGS. 7B-7D illustrate how, in some embodiments, the micro-mirror array operates as the mirrors are rotated over a range of motion in a synchronous fashion, as described above.

Figure 7E:
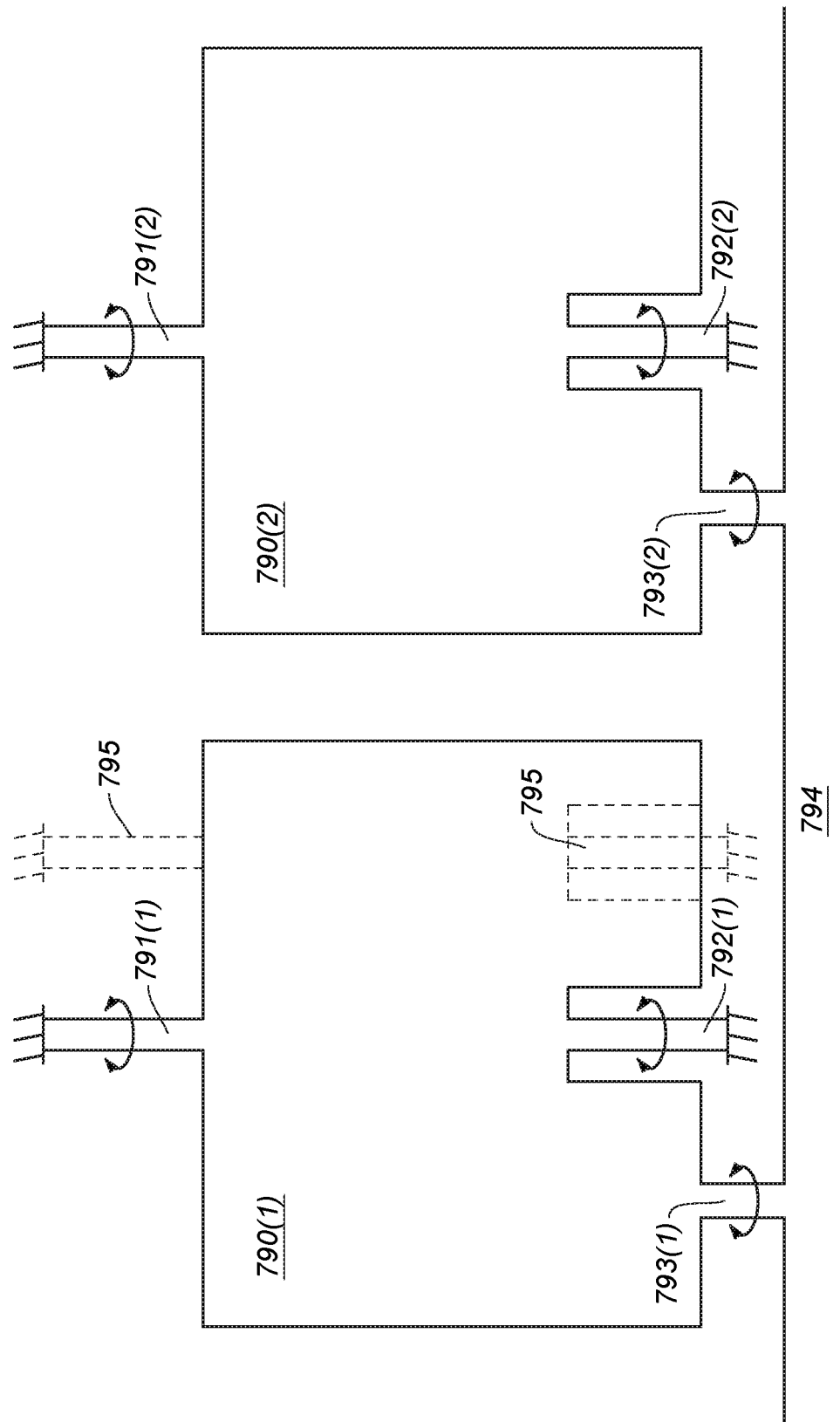

FIG. 7E shows an example of a plurality of mirror elements 790(1,2) with integrated coupling element 794 coupled to each corresponding mirror element at 793(1,2) and hinge structures (791(1,2) and 792(1,2)) configured as a unitary structure. These structures can be configured on a same plane (as shown), or different planes. The manner in which the hinge structures and coupling elements can flex can be similar to the example shown in FIGS. 5E-F. The rotational axis shown in FIG. 7E may be in the center of the mirror element (bisecting the mirror element) or to one side (shown in broken lines 795), as presented in FIGS. 7B-7D. Some embodiments may have a trench for the hinge structure so that the hinge and coupling element 794 do not come in contact, particularly if the structures are on the same plane (e.g., such as in the unitary structures etched from the same substrate, as described above).

FIGS. 8A-8B show simplified functional diagrams of the coupled, synchronous linear array of micro-mirrors shown in FIGS. 7A-7C, according to certain embodiments. Particularly, FIG. 8A shows the mirror elements synchronously rotated at a first deflection angle (e.g., zero deflection), and FIG. 8B shows the mirror elements synchronously rotated at a second deflection angle (e.g., positive deflection of approximately +45 degrees). In FIG. 8B, as mirror 720(1) rotates from the first deflection angle to the second deflection angle, coupling element 730 causes the other mirrors in the array to rotate equally and synchronously, as described above. That is, each mirror 720 can rotate on its corresponding axis 736. The coupling element 730 can couple to each mirror 720 at a coupling location (732) that, for each mirror, may be equidistant from the axis of rotation 736 (or 736(b)) for that mirror. The coupling element may rotate on an axis 762 at coupling location 732. One or more (integrated) MEMS actuators may be configured on axis 736 to rotate the mirror element, at coupling location 732 to rotate the coupling element on axis 762, or any combination thereof. In some cases, a subset of the mirrors (e.g., less than that total number of mirrors in the array) may have actuators or active actuators configured to rotate the mirrors. Although the range of motion (e.g., range of rotation of mirrors and coupling elements) is shown to be about 90 degrees in total over FIGS. 7B-D, other ranges are possible, as would be appreciated by one of ordinary skill in the art with the benefit of this disclosure.

Other variations of the systems, apparatuses, and techniques are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims. For instance, any of the embodiments, alternative embodiments, etc., and the concepts thereof may be applied to any other embodiments described and/or within the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter. The various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Although the present disclosure provides certain example embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some embodiments. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

What is claimed is:

1. A MEMS apparatus configured to redirect light in a LiDAR system, the MEMS apparatus comprising:
   a support frame;
   a plurality of mirror elements disposed in a linear array in an end-to-end, longitudinally configured arrangement within the support frame, wherein each mirror element of the plurality of mirror elements is rotatable on a rotational axis that is perpendicular to a line defined by the linear array of the plurality of mirror elements, wherein the plurality of mirror elements includes at least three mirror elements, and wherein each of the plurality of mirror elements are of the same size and dimensions; and
   a coupling element configured adjacent to and in parallel with the linear array of the plurality of mirror elements, the coupling element coupled to substantially a same location at each of the plurality of mirror elements, whereby the coupling element physically couples each of the plurality of mirror elements together such that a rotation of any one of the plurality of mirror elements causes a synchronous and equal rotation of the remaining mirror elements of the plurality of mirror elements coupled to the coupling element.

2. The MEMS apparatus of claim 1 further comprising:
   one or more processors; and
   one or more MEMS motors or actuators controlled by the one or more processors and configured to drive the coupling element that causes the plurality of mirror elements to synchronously and equally rotate over a range of motion.

3. The MEMS apparatus of claim 2 wherein the range of motion includes a rotational range of within 90 degrees.

4. The MEMS apparatus of claim 1 wherein the support frame, the coupling element, and the plurality of mirror elements are formed as a unitary structure with a common substrate.

5. The MEMS apparatus of claim 4 wherein the common substrate is a semiconductor substrate and the support frame, the coupling element, and the plurality of mirror elements are on a common plane.

6. The MEMS apparatus of claim 1 wherein a first mirror element of the plurality of mirror elements is coupled to the support frame by at least one support hinge configured along the rotational axis that facilitates the rotation of the first mirror element along the rotational axis.

7. The MEMS apparatus of claim 6 wherein the at least one support hinge, the support frame, the first mirror element, and the coupling element are a common, unitary structure formed on a common substrate.

8. The MEMS apparatus of claim 1 wherein each of the plurality of mirror elements are rectangular with:
   two opposing ends separated by a first distance defining a length and longitudinal arrangement of a corresponding mirror element; and
   two opposing sides separated by a second distance defining a width of a corresponding mirror element.

9. The MEMS apparatus of claim 1 wherein the coupling element flexes as the plurality of mirror elements are rotated.

10. A MEMS apparatus configured to redirect light in a LiDAR system, the MEMS apparatus comprising:
    a support frame;
    a plurality of mirror elements disposed in a linear array within the support frame, wherein each mirror element of the plurality of mirror elements is rotatable on a rotational axis that is perpendicular to a line defined by the linear array of the plurality of mirror elements, wherein the plurality of mirror elements includes at least three mirror elements, and wherein each of the plurality of mirror elements are of the same size and dimensions; and
    a coupling element coupled to substantially a same location at each of the plurality of mirror elements, whereby the coupling element physically couples each of the plurality of mirror elements together such that a rotation of any one of the plurality of mirror elements causes a synchronous and equal rotation of the remaining mirror elements of the plurality of mirror elements coupled to the coupling element.

11. The MEMS apparatus of claim 10 further comprising:
one or more processors; and
one or more MEMS motors or actuators controlled by the one or more processors and configured to drive the coupling element that causes the plurality of mirror elements to synchronously and equally rotate over a range of motion.

12. The MEMS apparatus of claim 10 wherein a range of motion includes a rotational range of within 90 degrees.

13. The MEMS apparatus of claim 10 wherein the support frame and the plurality of mirror elements are formed on a common substrate.

14. The MEMS apparatus of claim 10 wherein each of the plurality of mirror elements are rectangular with:
two opposing ends separated by a first distance defining a length and longitudinal arrangement of a corresponding mirror element; and
two opposing sides separated by a second distance defining a width of a corresponding mirror element.

15. The MEMS apparatus of claim 10 wherein a first mirror element of the plurality of mirror elements is coupled to the support frame by at least one support hinge configured along the rotational axis that facilitates the rotation of the first mirror element along the rotational axis.

16. The MEMS apparatus of claim 15 wherein the at least one support hinge, the support frame, the plurality of mirror elements, and the coupling element are a common, unitary structure.

17. A MEMS apparatus configured to redirect light in a LiDAR system, the MEMS apparatus comprising:
a support frame;
a plurality of mirror elements disposed in a linear array within the support frame, wherein each mirror element of the plurality of mirror elements is rotatable on a rotational axis that is perpendicular to a line defined by the linear array of the plurality of mirror elements, wherein the plurality of mirror elements includes at least three mirror elements, and wherein each of the plurality of mirror elements is of the same size and dimensions;
at least one support hinge for each of the plurality of mirror elements, each support hinge configured along a corresponding rotational axis and configured to couple a corresponding mirror element to the support frame; and
a flexible coupling element coupled to substantially a same location at each of the plurality of mirror elements, whereby the coupling element physically couples each of the plurality of mirror elements together such that a rotation of any one of the plurality of mirror elements causes a synchronous and equal rotation of the remaining mirror elements of the plurality of mirror elements coupled to the coupling element.

18. The MEMS apparatus of claim 17 wherein the at least one support hinge, the support frame, the plurality of mirror elements, and the coupling element are a unitary structure formed on a common substrate.

* * * * *